US005464670A

United States Patent [19]

Ikuma et al.

[11] Patent Number: 5,464,670

[45] Date of Patent: Nov. 7, 1995

[54] RESIN BOUND MAGNET AND ITS PRODUCTION PROCESS

[75] Inventors: Takeshi Ikuma; Masaaki Sakata; Hiroharu Akioka; Tatsuya Shimod, all of Suwa, Japan

[73] Assignee: Seiko Epson Corporation, Nagano, Japan

[21] Appl. No.: 188,733

[22] Filed: Jan. 31, 1994

Related U.S. Application Data

[63] Continuation of Ser. No. 508,719, Apr. 13, 1990, abandoned.

[51] Int. Cl.[6] .......... B32B 1/08

[52] U.S. Cl. .......... 428/35.8; 428/36.9; 428/900; 264/177.14

[58] Field of Search .......... 428/36.9, 35.8, 428/900; 264/177.14, 177.17

[56] References Cited

U.S. PATENT DOCUMENTS

| | | | |
|---|---|---|---|
| 3,732,617 | 5/1973 | Rowe et al. | 29/608 |
| 4,457,851 | 7/1984 | Tabaru et al. | 252/62.63 |
| 4,601,224 | 7/1986 | Clark, III | 83/74 |

FOREIGN PATENT DOCUMENTS

| | | |
|---|---|---|
| 0255816 | 2/1988 | European Pat. Off. . |
| 0318251 | 5/1989 | European Pat. Off. . |
| 2449957 | 9/1980 | France . |
| 1373019 | 11/1974 | United Kingdom . |

OTHER PUBLICATIONS

Patent Abstracts of Japan, vol. 13, No. 5 (E-701)(3353) 09 Jan. 1989, & JP-A-63 216318 (Seiko Epson Corp.,).

Patent Abstracts of Japan, vol. 12, No. 367 (E-664)(3214) 30 Sep. 1988, & JP-A-63 120407 (Shin Etsu Chem Co Ltd.,).

Patent Abstracts of Japan, vol. 10, No. 75 (E-390)(2132) 25 Mar. 1986, & JP-A-60 220918 (Suwa Seikosha K.K.).

Patent Abstracts of Japan, vol. 10, No. 359 (E-460)(2416) 03 Dec. 1986, & JP-A-61 158118 (Yamauchi Rubber Ind Co Ltd.,).

Patent Abstracts of Japan, vol. 11, No. 127 (E-501)(2574) 21 Apr. 1987, & JP-A-61 272914 (Seiko Epson Corp.,).

Patent Abstracts of Japan, vol. 10, No. 65 (E-388)(2122) 14 Mar. 1986, & JP-A-60 217617 (Suwa Seikosha K.K.).

Patent Abstracts of Japan, vol. 12, No. 162 (E-609)(3009) 17 May 1988, & JP-A-62 273708 (Seiko Epson Corp.,)

Patent Abstracts of Japan, vol. 8, No. 194 (E-264)(1631) 06 Sep. 1984, & JP-A-59 80902 (Hitachi Kinzoku K.K.).

Patent Abstracts of Japan, vol. 13, No. 264 (E-774)(3612) 19 Jun. 1989, & JP-A-1 55814 (Fuji Electrochem Co Ltd.,).

Patent Abstracts of Japan, vol. 12, No. 355 (E-661)(3202) 22 Sep. 1988, & JP-A-63 110616 9Kanegafuchi Chem Ind Co Ltd.,).

Patent Abstracts of Japan, vol. 14, No. 292 (E-944)(4235) 25 Jun. 1990, & JP-A-2 94411 (Tokin Corp.,) 05 Apr. 1990.

*Primary Examiner*—Alexander S. Thomas

*Attorney, Agent, or Firm*—Cushman Darby & Cushman

[57] ABSTRACT

A resin bonded magnet including a rare earth magnetic powder and an organic resin moulded into a single body having a cylindrical form. The resin bonded magnet satisfies the condition:

$$2\ DL/d^2 \geqq 1.56$$

where D is the outer diameter of the magnet, d is the inner diameter, and L is the magnet's length. The rare earth magnetic powder has a coercivity between 7 kOe and 12 kOe. The magnetic powder has an average particle size, r, satisfying:

$$1\ \mu m \leqq r \leqq 0.1\ t (t \leqq 1\ mm)$$

where t is the thickness of the moulded article.

10 Claims, 6 Drawing Sheets

RESIN BOUND MAGNET AND ITS PRODUCTION PROCESS

This is a continuation of application Ser. No. 07/508,719, filed on Apr. 13, 1990, which is abandoned.

This invention relates to a resin bonded magnet which is useful for miniature motors, encoders, linear actuators, electronic instruments and the like, and to a process for producing the same. More especially, the invention is concerned with a cylindrical or thin plate resin bound type magnet and a process for producing the same by extrusion moulding.

The resin bound type magnet is generally produced by (1) an injection moulding method, (2) a press moulding method and (3) an extrusion moulding process.

Of these moulding methods, the injection moulding method comprises moulding a predetermined shape by packing a magnet composition comprising a magnetic powder and a thermoplastic resin into a die and heating it at a temperature at which a sufficient fluidity is attained.

The press moulding method comprises pressing after packing a magnet composition comprising a magnetic powder and a thermosetting resin into a die of a press machine.

The extrusion moulding method comprises fluidizing a magnetic composition by heating a magnetic powder and a resin to the molten state and extruding by a screw, ram or plunger through a die.

Among these moulding methods, the injection moulding and the press moulding can mould a magnet having an anisotropy by applying a magnetic field in the die at the moulding step. However as for the injection moulding method and a press moulding method for a moulding of a long sized magnet for which demand is recently increased, in the case of the injection moulding method because of difficulties in packing of a magnet composition in a cavity and of removing a moulded article, etc and in the case of the press moulding method, since a length of a moulded article is determined by a stroke of a moulding punch, the length of the moulded article is limited. Especially in the case of a moulding of a cylindrical magnet having a radiated anisotropy, there is a limitation on the length of the moulded article, and a magnet, of which an outer diameter (hereinafter called as D), an inner diameter (hereinafter called as d) and a length (hereinafter called as L) satisfy the following equation, can only be moulded.

$$2DL/d^2<1$$

(Reference literature: Masaaki Hamano, an abstract book on the 9th meeting of Injection Moulding Technology of High Performance Plastic Magnet and Its Application Development, Plastic Industry Technical Committee 1986).

Accordingly as to a cylindrical magnet which satisfies $$2DL/d^2\geqq 1,$$

only 2 kinds were obtainable i.e. one was a single moulded magnet with an isotropy or with a poor magnet performance and the other was one which was prepared by sticking together a plurality number of the magnets having a radiated anisotropy.

However the aforementioned cylindrical resin bound type magnet and its production process have the problems listed below.

(1) In order to get a high performance motor or an actuator by using an isotropic magnet or a magnet having a performance close to the isotropic magnet, the volume of the magnet to be used has to be large, and a miniaturization and a light weighing of these instruments can not be satisfied.

(2) In the case a plurality of the magnets having a radicated anisotropy are stuck together, there are the following problems.

[1] The sticking is weak against delamination and there is a danger of destroying the bond by a repeated hot and cold cycle. It has an inferior reliability such as a variation of the sticking strength, etc.

[2] The production cost is raised because of the sticking in the production process. Furthermore the stuck magnet has to be finished by a cutting fabrication, etc to ensure a dimensional accuracy of the moulded article resulting in a further increase of the production cost.

[3] In case of finishing by the cutting fabrication of the moulded article, there is the possibility of a deterioration of the magnet performance by the finish.

(3) As for the injection moulding method and the press moulding method, these methods require a fixed cycle of a packing, a moulding and a removing of a magnet composition to/from a die in the moulding process, and productivity is limited because these methods represent basically a batch type production system. It is, therefore, difficult to achieve reduction of production cost.

(4) As for the conventional extrusion moulding method, it is a major method not to apply a magnetic field at the moulding stage. However an isotropic magnet can only be attained by this moulding method.

Accordingly the extrusion moulding method is popular because it has a very high productivity due to an ability of a continuous operation from a supply of a raw material to a receipt of a moulded article, and is also able to easily mould a long sized magnet. Substantial research has been done to improve the magnet performance, especially research on an extrusion moulding method in a magnetic field in order to reform the magnetic property which has been considered to be poor.

Concerning a method to charge a magnetic field at the moulding step, as for a column type magnet, there is a report by R. E. Johnson ("Development in The Production of Bonded Rare Earth-Cobalt Magnets." 5th International Workshop on Rare Earth-Cobalt Magnets and Their Applications, 1981), and as for a cylindrical magnet, there are methods shown in Japan Patent Laid-Open Sho 58-219705 and Japan Patent Laid-Open Sho 61-121307.

Both of these methods were to form a magnet by orientating an anix of easy magnetization of a magnetic powder to a direction of a magnetic field by charging a magnetic field in a die of an extrusion machine while a magnet composition was being passed through the die. However for example in a method described in Japan Patent Laid-Open Sho 61-121307, a cylindrical magnet magnetized and orientated in a die was cooled by a cooling unit outside the die, a direction of the anisotropy was only formed in one direction and a moulded article having a radiated anisotropy in a diameter direction could not be obtained. Moreover, when the moulded article was extruded from the die, its temperature was still high resulting in a deterioration of a magnet performance by a disorder of an orientation of a magnetic powder. As a result, it is not attainable to get a cylindrical magnet having a high magnet performance radiated anisotropy even if this method is applied.

Moreover there are below-listed problems in the aforementioned production method.

(1) In the conventional extrusion moulding method in a magnetic field, a electromagnetic coil is merely installed on the die and no consideration is paid for a demagnetization of a moulded article produced. If there is a residual magnetism in a moulded article, it is very difficult to handle in the post process such as an adhesion at a cut stage to a cutter or other magnetic materials. Further when a predetermined magnetization is carried out for the magnet, the residual magnetism give an unfavorable influence to a balance of the magnetization.

(2) As an example of a moulding method in which the demagnetization of the extrusion moulded article is considered is disclosed in Japan Patent Laid-Open Sho 60-217617. However since the demagnetization coil is equipped at a front end of a die in this case, it results in an extremely large die and a mouldability is poor. Especially since a passage of a raw material compound in the die is long, the moulding speed is slow and the moulding itself is also difficult.

(3) When a cylindrical magnet having a radiated anisotropy is moulded, a length of an orientation section on which a magnetic field is charged due to a constitution of a magnetic circuit is determined by an inner diameter of the moulded article. However since a considerably high magnetic field is generally required to orientate a rare earth magnet powder, the length of the orientation has to be relatively short in order to charge a sufficient magnetic field at the orientation section. Consequently it is essentially not able to mould a cylindrical magnet with a high magnet performance having a small inner diameter.

(4) When a column type or a sheet type magnet is moulded, the length of the orientation section can be made long in a certain degree. However a gap between pole pieces can not be made too short due to a mechanical strength of the die, and thus it is not able to increase a magnetic field to be charged at the orientation too high. The magnet performance of the moulded article therefore drops.

In case that a thermoplastic resin is used as a resin in the aforementioned extrusion moulding method, the moulding is carried out by a solidification with cooling of a molten mixture after orientating at the front end of the die. When a thermosetting resin is used as a resin, there are methods to mould by a solidification with cooling after orientating at the front end of the die as same to the thermoplastic resin, and to mould by a curing with heating after the orientating.

In case of a method with the solidification with cooling by using the thermosetting resin, it is necessary to heat it to cure the resin after the moulding. Even if the moulding is done by either method, a magnet moulded is extruded continuously, and it is necessary to cut the magnet moulded in a predetermined length. For the cut, mechanical cutting methods namely a guillotine cutter system or a rotary saw-tooth system were utilized in the conventional method.

However the conventional cutting methods had below-listed problems.

In case of a mechanical cutting method such as the guillotine cutter system or the rotary saw-tooth system, a force and a vibration are charged to a magnet to be cut. When an uncured resin bound type magnet moulded by a solidification with cooling by using a thermosetting resin is cut and a thin thickness magnet characterized by an extrusion moulding is cut, a crack, a breakage and/or a deformation of the magnet take place during the cutting because of a brittleness and a weakness of the magnet to be cut.

Particularly When a volume ratio of the magnetic powder in a resin bound type magnet is increased in order to improve a performance of the magnet, the volume ratio of the resin decreases and the aforementioned problems tend to happen further easily because of a reduction of bonding force of the resin with the magnetic powder. Moreover in case of the mechanical cutting method, a cut dust is unavoidably produced. In case of a rare earth magnet, especially a R-Co type magnet, a treatment of the cut dust is extremely important because cobalt has a bad effect to a human body, and it requires a recovery unit of the cut dust.

Further among the conventional moulding methods by using a thermosetting resin, a press moulding was widely used, but an injection moulding and an extrusion moulding were not widely used and a thermoplastic resin was commonly used.

Accordingly only a few methods were available to cure an uncured magnet by heating moulded by the injection moulding and by the extrusion moulding, and the method was to secure a cylindrical shape of the magnet with a centrifugal force by rotating a jig after fixing its outer diameter to the jig.

The problems of the aforedescribed conventional technology are summarized as below.

First, it is a use of a thermoplastic resin for moulding a magnet by an injection moulding and the extrusion moulding. In order to make a magnet moulded by a thermoplastic resin to be usable even at a temperature at around 150° C., its moulding temperature has to be at 200° C. or more. Therefore a magnetic powder blended with the resin is exposed at such a temperature.

When a rare earth magnet, especially a R-Fe-B type magnet is used as a magnetic powder, a deterioration of a magnet performance of the magnet happens due to an oxidation of the magnetic powder at a high temperature above 200° C. since the magnetic powder easily oxidized. Moreover, the thermoplastic resin has problems on heat resistance and solvent resistance when compared with a thermosetting resin.

Next, methods of the curing by heating after moulding by using the thermosetting resin are pointed out. For a moulding by using the thermosetting resin, it requires that the resin possesses a thermoplastic property in a certain temperature region. Novertheless this temperature region is lower or higher than the thermosetting temperature, it is necessary to secure the shape once moulded in order to cure it.

In order to achieve it, methods in the conventional technology are available. However in a conventional production process of a cylindrical resin bound type magnet, since the inner diameter is not fixed, a fixing jig of the outer diameter is rotated with a sample to secure the shape during the curing, and the jig for this purpose is thus required. Furthermore it is difficult to operate the curing treatment for lots of magnets by this method, and it has problems such as a curing treatment for a long sized magnet moulded by an extrusion moulding method is also difficult, etc.

Further in the past, as to a particle size of a magnetic powder in a resin bound type magnet, a concern of an oxidation when the magnetic powder was fining was considered, but no consideration of the particle size of the magnetic powder from a viewpoint of a thickness of a magnet moulded article was considered.

Further in order to mould a magnet with a thickness of 1 mm, it was necessary to make the desired thickness by a cutting fabrication after moulding one with the thickness more than 1 mm by a press moulding or an injection moulding in advance.

However the particle size of a magnetic powder gives a large influence to the thickness of a moulded article of an anisotropic resin bound type magnet. Namely if the average particle size of a magnetic powder does not change, an orientation of one magnetic particle affects more to a degree of the orientation of the magnet by thinning the thickness of the moulded article. For example, when an anisotropic magnet with a thickness of 0.5 mm is moulded, if the average particle size of the magnetic powder is 50 μm, the influence that one magnetic particle gives to the orientation is around 10%. Although the influence is reduced if the thickness of the moulded article becomes 0.5 mm or more, the influence is enlarged if the thickness becomes thinner. Accordingly as to the average particle size of the magnet, a problem is generated that it should relate to the thickness of the magnet moulded article.

Further by a conventional method to mould a magnet with the thickness 1 mm or less, it resulted in high production cost, etc because of the fabrication process required.

Further, a rare earth magnet, especially a rare earth-iron-boron type magnet was easily oxidized, and there was a problem of a formation of rust during its service.

In order to solve the problem, a coating method of a resin on the magnet moulded, a metal plating and a coating of a ceramic or a resin on the magnetic powder were investigated in the past.

However, following problems are enumerated in the aforementioned conventional rust resistance technology of a magnet.

The former method in which a resin is coated on a magnet moulded does not have an effect to an oxidization of the magnetic powder during the moulding. In other words, when an injection moulding or an extrusion moulding is performed, the magnetic powder is exposed under a high temperature during kneading of the magnetic powder and the resin or moulding, and the magnetic powder can be oxidized at this stage resulting in an impossibility of the moulding and a deterioration of a magnet performance. Moreover if a slight pin hole is present in a coating film after the moulding, there is a problem that the magnet inside it is oxidized from it.

From considering these problems, the latter method in which a metal plating or a coating with a ceramic, a resin, etc on the magnetic powder may be a method to solve the aforementioned problems.

However the latter method still has a problem. The average particle size of a magnetic powder is several tens of microns, if a film is coated on it, its thickness has to be 1 micron or less, and therefore there is a problem that the film coated has to be extremely tough and strongly adhesive or it has to establish a production process not to remove the film coated.

Further in the past, a thin plate state resin bound type magnet was mainly produced by a calendar moulding method, an extrusion moulding method and an injection moulding method.

For each moulding method, a mixture kneaded of a magnetic powder and a thermoplastic resin is used and in case of the calendar moulding method, the aforedescribed magnet raw material is made in a thin plate state by rolling with hot rollers.

However the production process of the aforementioned thin plate state resin bound type magnet has below-listed problems.

(1) In case of the calendar moulding method, an isotropic moulded article can only be obtained when a rare earth magnetic powder is used since it is not possible to charge a magnetic field during the moulding, and thus a magnet performance of the magnet is low.

Further because of a heating capacity of the rollers, it is not possible to use a resin having a very high melting point as a binder, and the heat resistance of the moulded article is inferior.

Furthermore it requires a certain flexibility in the moulded article for the moulding, and therefore an amount of a magnetic powder in a raw material can not be considerably large resulting a low magnet performance of the moulded article.

(2) In case of a moulding of a thin plate state magnet by an extrusion moulding method, an unevenness of the moulded article is likely to happen due to a difference of the extrusion rate between a central point and an outer point of the outlet of the die. Accordingly in order to produce an evenly moulded article, a complicated design of the passage in the die is required and the die becomes extremely expensive.

Further when the moulding is carried out in a magnetic field, the gap between pole pieces can not be made very small because of a concern of mechanical strength of the die, and thus the magnetic field to be charged at the moulding can not be very high. Consequently a magnet performance of the moulded article is deteriorated.

(3) In case of a moulding of a thin plate state magnet by an injection moulded, it is difficult to mould one having a thickness of 1 mm or less. This is due to a generation of a poor moulding by an insufficient packing of the moulding raw material into the cavity of the die if the thickness is thin, since the moulding raw material has a poor fluidity containing a large amount of a magnetic powder.

Further when an anisotropic magnet is moulded and if the thickness is thin, a moulding with a substantially isotropy can only be obtained because of an effect of a skin layer (a section where the ratio of the resin is high) of the magnet surface.

Further a big moulding machine is required to mould a magnet having a large area, and it is disadvantageous from a moulding cost.

This invention, therefore, is to solve the above-discussed problems, and its objective is to provide a resin bound type magnet with a high magnet performance, especially a long sized cylindrical resin bound type magnet having a radiated anistropy, and to provide a production process of the magnet with a good productivity.

Further the objective is to provide a production process of a magnet with a simple cutting method without a crack, a breakage and a deformation.

Furthermore this invention aims to provide a production process by simplifying the production process and by reducing a cost, by improving a magnet performance of a magnet moulded by means of establishing a relation between a magnetic powder and a thickness of the magnet, and by moulding a magnet by an extrusion with superior oxidation resistance and weather resistance.

Moreover this invention aims to provide a production process with a good productivity for a high performance thin plate state resin bound type rare earth magnet.

Figure 1:
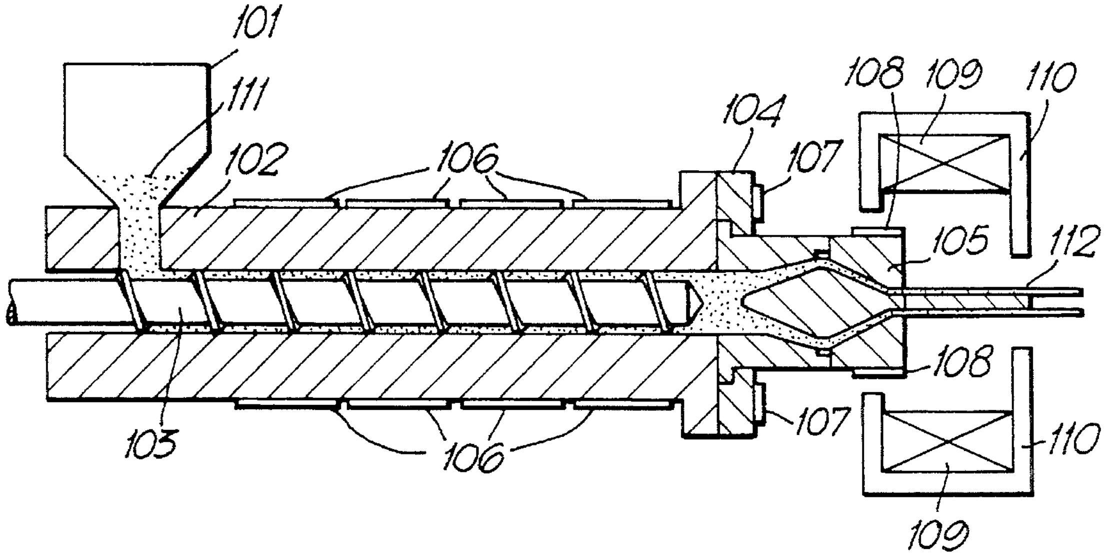
FIG. 1 is a sketch of an extrusion moulding machine used in Example of this invention.

This invention is a resin bound type magnet and its production process is described below.

(1) A resin bound type magnet comprising a magnetic powder and an organic resin wherein it is moulded as a single body in a cylindrical form satisfying the relation $$2DL/d^2 \geqq 1$$

among the outer diameter (D), the inner diameter (d) and the length (L) of the magnet, and it also has a radiated anisotropy in the diameter direction.

(2) A composition of a resin bound type magnet of the aforementioned invention comprises a magnetic powder, an organic resin and an additive.

(3) A production proces of a resin bound type magnet wherein a raw material for the moulding comprising a magnetic powder and an organic resin is moulded by an extrusion by passing through a die in which a magnetic field is charged while it is being cured, is formed to a single body in a cylindrical form satisfying a relation of $$2DL/d^2 \geqq 1$$

among the outer diameter (D), the inner diameter (d) and the length (L) of the magnet and it also has a radiated anisotropy in the diameter direction.

(4) A composition of a resin bound type magnet in the production process of the aforementioned invention comprises a magnetic powder, an organic resin and an additive.

(5) A production process of a resin bound type magnet by an extrusion moulding of a moulding raw material comprising a magnetic powder and an organic resin wherein a die structure for moulding is constituted that a front end of a mandrel section is projected in front of an edge of a outer die, a magnetic circuit is formed between the mandrel section, the outer die and an electromagnetic coil are installed at an outer circumference of the die, it is moulded in a cylindrical form by charging a magnetic field in the die by the electromagnetic coil, and the moulded article extruded is demagnetized at the front end of the mandrel.

(6) A Composition of the magnet of the aforementioned invention comprises a magnetic powder, an organic resin and an additive.

(7) A production process of a resin bound type magnet by an extrusion moulding of a moulding raw material comprising a magnetic powder and an organic resin wherein an electromagnetic coil is installed at an outer circumference of a die by it, it is moulded in a cylindrical form by charging a magnetic field in the die, an electromagnetic coil with an air-core is also installed in front of the aforementioned electromagnetic coil to generate a magnetic field for demagnetization in the said electromagnetic coil, and the moulded article extruded is demagnetized.

(8) A composition of the magnet of the aforementioned invention comprises a magnetic powder, an organic resin and an additive.

(9) A production process of a resin bound type magnet which is constituted by orienting a magnetic powder in a molten mixture of a magnetic powder and a resin in a section where a magnetic field is charged at a front end of a die, moulding it in a cylindrical form, solidifying it with cooling and extruding it wherein when the magnet is cut, the resin is cut by melting by contacting the magnet with a heated wire.

(10) A production process of a resin bound type magnet wherein a composition of the molten mixture of the aforementioned invention comprises a magnetic powder, an organic resin and an additive.

(11) A production process of a resin bound type magnet of the aforementioned (9) or (10) wherein the resin bound type magnet is an isotropic magnet moulded by an extrusion in a cylindrical form without an orientation.

(12) A production process of moulding a resin bound type magnet in a cylindrical form by an injection moulding or an extrusion moulding of a magnetic powder and a thermosetting resin wherein in order to cure the molten mixture of the magnetic powder and the resin by heating, it is cured by heating with fixing the outer circumference of the cylindrical magnet by a jig and the inner circumference by an elastic material expanded by a gas.

(13) A production process of a resin bound type magnet wherein a composition of the molten mixture of the aforementioned invention comprises a magnetic powder, an organic resin and an additive.

(14) A production process of a resin bound type magnet of the aforementioned (12) or (13) wherein the aforementioned elastic material is a silicone rubber.

(15) A production process of a resin bound type magnet comprising a magnetic powder and an organic resin wherein a mixture of the rare earth magnetic powder premagnetized in a magnetic field which is stronger than a coercive force of the magnetic powder and the organic resin is kneaded, and the kneaded mixture is moulded by an extrusion in a magnetic field.

(16) A production process of a resin bound type rare earth magnet wherein a composition of the magnet of the aforementioned invention comprises a magnetic powder, an organic resin and an additive.

(17) A production process of a resin bound type magnet by an extrusion moulding of a moulding raw material comprising a magnetic powder and an organic resin with a die in a magnetic field wherein it is moulded by an application of a slight vibration to the die at the moulding.

(18) A production process of a resin bound type rare earth magnet wherein a composition of the magnet of the aforementioned invention comprises a magnetic powder, an organic resin and an additive.

(19) A resin bound type magnet comprising a magnetic powder and a resin wherein an average particle size r of the aforementioned magnetic powder satisfies $$r \leqq 0.1\ t\ (t \leqq 1\ \text{mm})$$

with the thickness t of the moulded article of an anisotropic resin bound type magnet comprising the magnetic powder and the resin.

(20) Further a resin bound type rate earth magnet wherein a composition of the magnet of the aforementioned invention comprises a magnetic powder, an organic resin and an additive.

(21) A production process of a resin bound type magnet comprising a magnetic powder and a resin wherein an average particle size r of the aforementioned magnetic powder satisfies $$r \leqq 0.1\ t\ (t \leqq 1\ \text{mm})$$

with the thickness t of the moulded article of an anisotropic resin bound type magnet comprising the magnetic powder and the resin, and the magnet is produced by an extrusion moulding with a die in a magnetic field.

(22) A production process of a resin bound type rare earth magnet wherein a composition of the magnet of the aforementioned invention comprises a magnetic powder, an organic resin and an additive.

(23) A production process of a resin bound type magnet comprising a moulding of a mixture of a magnetic powder and an organic resin by an injection moulding or an extrusion moulding wherein a compound is prepared by charging in a kneading machine after making a viscosity η of the mixture of the aforementioned magnetic powder and organic resin in a state of $$\eta \leqq 8\ [\text{kpoise}]\ (\text{shear rate}=10000\ \text{sec}^{-1})_x$$

by heating

(24) A production process of a resin bound type magnet wherein a composition of the magnet of the aforementioned invention comprises a magnetic powder, an organic resin and an additive.

(25) A production process of a resin bound type magnet in the inventions of the aforementioned (23) and (24) wherein the surface of the magnetic powder is coated with a metal plating or ceramics.

(26) A production process of a thin plate state resin bound type rare earth magnet wherein a moulding raw material comprising a magnetic powder and an organic resin is moulded by an extrusion in a cylindrical magnet by passing it through a die, then one or plural points on the circumference of the said cylindrical magnet is/are cut in a direction parallel with the central axis of the moulded article and the moulded article cut is spread to make it in a thin plate state.

(27) A production process of a resin bound type magnet wherein a composition of the moulding raw material of the aforementioned invention comprises a magnetic powder, an organic resin and an additive.

(28) A production process of a resin bound type magnet in the inventions of the aforementioned (26) and (27) wherein the outer diameter (D) of the cylindrical magnet to be moulded by an extrusion and the inner diameter (d) satisfy a relation of $$0.75 \leqq d/D < 1.$$

(29) A production process of a thin plate state resin bound type rare earth magnet wherein a moulding raw material comprising a magnetic powder and an organic resin is passed through a die where a magnetic field is charged to mould a cylindrical magnet having a radiated anisotropy in the diameter direction by an extrusion, then one or plural points on the circumference of the said cylindrical magnet is/are cut in a direction parallel with the central axis of the moulded article and the moulded article cut is spread to make it in a thin plate state.

(30) Further a production process of a resin bound type magnet wherein a composition of the moulding raw material of the invention of the aforementioned (29) comprised a magnetic powder, an organic resin and an additive.

(31) A production process of a resin bound type magnet in the inventions of the aforementioned (29) and (30) wherein the outer diameter (D) of the cylindrical magnet to be moulded by an extrusion and the inner diameter (d) satisfy a relation of $$0.85 \leqq d/D < 1$$

(32)–(41) are those in which the magnetic powder, the organic resin and the additive are limited for this invention.

As for a magnetic powder which can be applied in this invention, a ferrite family magnetic powder and a so-called rare earth magnetic powder such as a magnetic powder composing of a rare earth metal and transition metals mainly constituting cobalt and iron as a basic composition, or a magnetic powder being of a rare earth metal, transition metals mainly constituting iron and boron as a basic composition, etc are enumerated.

As for an organic resin which can be applied in this invention, it can be either a thermoplastic resin or a thermosetting resin, and as for the thermoplastic resin, for example, a plastic such as polyamide, polypropylene, polycarbonate, polyphenylenesulphide (PPS), etc, an elastomer such as chlorinated polyethlene, ethylene vinylacetate copolymer (EVA), etc and synthetic rubber are enumerated.

As for the thermosetting resin, for example, ethylene family unsaturated polyester resin, epoxy resin, etc are enumerated.

Further as for the additive, a lubricant to reduce an extrusion resistance at the moulding such as a metal soap (zinc stearate, calcium stearate), wax, etc can be used, and as for the aforementioned crosslinkable thermosetting resin, an additive such as peroxides which accelerates the crosslinking reaction can also be used.

The magnetic powder is sufficiently mixed with the organic resin and the additive if it is necessary. Then the mixture is sufficiently kneaded in a kneading machine with heating above a temperature at which the organic resin is molten, and it is granulated. The magnetic composition granulated is charged in an extrusion machine, it is heated in a cylinder to make it in a fluidized state and is sent into a die by a screw or a plunger. The magnetic composition injected in the die is moulded by uniforming (orientating) an axis of easy magnetization of the magnetic powder in the raw material to a direction of a magnetic field by passing through a die in which a magnetic field is charged. The magnetic composition is solidified by cooling while it is in the magnetic field formed in the die, and it is extruded. The moulded article is then cut into a suitable length. When a crosslinkable organic resin is used as a binder, after a demagnetization of the moulded article cut, a crosslinking of the organic resin is achieved by heating or an irradiation (r ray, electron beam, etc). A resin bound type magnet is thus produced.

Further the moulded article extruded from the die is demagnetized by charging a magnetic field of a reverse direction to the magnetic field charged in the die at the moulding at a front end of the mandrel. The strength of the magnetic field is adjusted by a distance between the mandrel and a yoke of the electromagnetic coil. The moulded article extruded from the die is also demagnetized by charging a magnetic field for an attentuation by passing it through an electromagnetic coil for the demagnetization. A cylindrical resin bound magnet is thus produced.

Further this invention is useful to facilitate an orientation of a magnetic powder, to improve the magnetic property and to reduce an extrusion resistance at the moulding, and is also beneficial to increase the moulding rate by an application of a ultrasonic osillator or a mechanical vibration such as a vibrator, etc.

According to this invention, by defining an average particle size of a magnetic powder with a thickness of an anisotropic resin bound type magnet moulded article, and the magnet is moulded by an extrusion, it is possible to mould a thin thickness anisotropic magnet without a post-fabrication, and further a high performance magnet may be moulded.

Further according to this invention, it has effects to prevent a delamination of a coated film on the surface of a magnetic powder and to improve an oxidation resistance of the magnet moulded by kneading a mixture of the magnetic powder and a resin after heating it to make a viscosity of the mixture at 300 Kpoise or less prior to the kneading to absorb the molten state resin on the surface of the magnetic powder resulting a relief of a mechanical stress.

Next, in order to make a thin plate state magnet, one or plural points on the circumference of the moulded article in a cylindrical form are cut in parallel with the central axis of the moulded article. Then the aforementioned moulded article cut is made in a thin plate state by using, for example, two rollers, etc. The moulded article is then solidified by cooling, and is cut into a suitable length.

Further as an alternative method, after cutting a cylindrical moulded article extruded into a suitable length, one or plural points on the circumference of the moulded article are cut in parallel with the central axis of the moulded article. The moulded article cut is heated and it is spread when a viscosity of the moulding article drops to make a thin plate state.

As described above, a magnet of this invention is superior to a conventional magnet, in which plural magnets are stuck, from a viewpoint of a reliability. Furthermore by an application of a production process of this invention, (1) A cylindrical resin bound type magnet with a high magnet performance can be produced with a high productivity and an economic cost.

(2) Since no excess force or vibration is charged in the magnet at a cutting step by cutting an extruded resin bound type magnet with a wire heated by an electric resistance, it is possible to cut an uncured magnet which is very brittle and a thin thickness magnet without cracking and a breakage.

(3) A large amount of a thermosetting treatment can be operated with a low cost, the operation becomes easy, and further a dimensional accuracy of a cylindrical resin bound type magnet can be improved.

(4) It has a significant effect for moulding a cylindrical magnet having a radiated anisotropy in a diameter direction though it is difficult to get a strong magnetic field at the moulding.

(5) It can be widly used for a magnetic sensor, an encoder, an acutuator, a linear actuator which requires a miniturization, a precision and a high performance.

Further according to this invention by defining the average particle size of the magnetic powder by the thickness of the anisotropic resin bound type magnet moulded article and by moulding the magnet by an extrusion, it is possible to mould a thin thickness anisotropic magnet without a post-fabrication, and it is also possible to mould a magnet with a high performance.

Furthermore according to this invention by kneading a mixture of a magnetic powder and a resin after heating it to make its viscosity at 300 kpoise or less prior to the kneading, the resin in a molten state is absorbed on the surface of the magnetic powder, and thus it has effects to prevent the coated film on the surface of the magnetic powder by relieving a mechanical stress and to improve an oxidation resistance of the magnet moulded.

EXAMPLE

This invention is explained in details in accordance with examples shown below.

EXAMPLE 1

Raw materials were molten to make a composition as Sm (Co 0.672 Cu 0.08 Fe 0.22 Zr 0.028) 8.35, after casting, an ingot produced was magnetically cured by a heat treatment, and then a magnetic powder of its average particle size 10 μm was prepared by crushing the said ingot.

The magnetic powder, nylon 12 powder and zinc stearate powder were mixed to make a ratio of 92 wt %, 7.9 wt % and 0.1 wt % respectively.

The mixture was kneaded by a two axes extrusion kneading machine at 260° C.

The kneaded material was granulated to make granules of an outer diameter 1–10 mm, they were used as a raw material compound 111, and a cylindrical magnet was produced by an extrusion machine.

The moulding method is explained in accordance with FIG. 1. The moulding machine consists of a hopper ie a raw material charging section 101, a cylinder 102, a screw 103, an adapter plate 104 to equip a die at the cylinder 102, a die 105 and a driving motor of the screw (which is not shown in figure), and further an electromagnetic coil 109 to charge a magnetic field in the die is positioned at the outside of the die 105.

A yoke 110 comprising a magnetic material is installed around the electromagnetic coil 109.

The aforementioned granulated raw material compound was charged in the extrusion machine.

Figure 2:
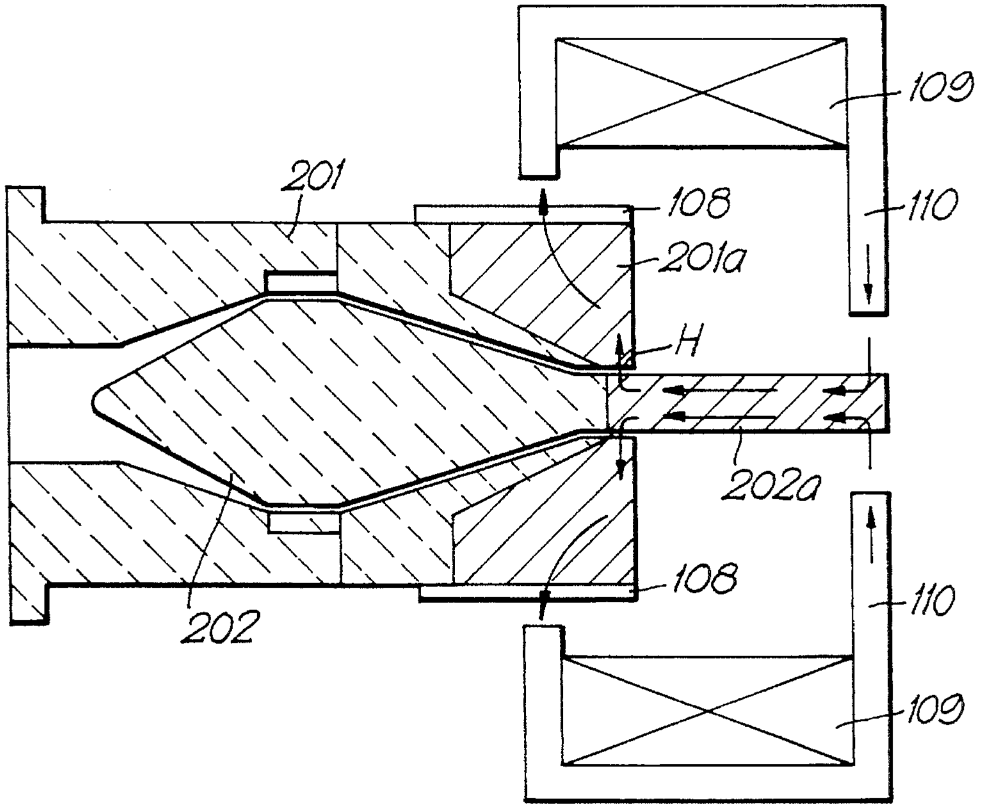
FIG. 2 is a sketch of a die structure for an extrusion moulding in a magnetic field of a cylindrical resin bound type magnet used in Example of this invention.

The raw material compound 111 was heated at 260° C. in the cylinder 102 to make it in a fluilized state, and it was passed through the die 105. The die structure is shown in FIG. 2.

The die is constituted by an outer die 201 and a mandrel 202. Although the outer die is made of a non-magnetic material, a ring shaped outer die section magnetic material **201*a* to induce a magnetic flux is installed at the front end. The mandrel 201 is also made of a non-magnetic material, and further a mandrel section magnetic material 202*a*** is installed at its front end.

When a current is passed through the electromagnetic coil 109 installed outside of the die, the magnetic flux generated flows alongside of a magnetic flux flow H shown in Figure by an arrow since it tends to pass through a magnetic material with a high magnetic permeability. Accordingly a radiated shape magnetic field is generated in a space (hereinafter called as an orientation section) between the front end **202*a* of the mandrel 202 and the ring shaped outer die 201*a* of a magnetic material installed in the outer die 201**. Therefore when a magnetic composition passes through the orientation section, it is moulded with a progress of the orientation of the magnetic powder.

In this example, the magnetic field for moulding was 15 KOe, the temperature of the die at the moulding was 250° C. and the cooling was performed by a forced air cooling at the outlet section of the die.

Accordingly, an orientated raw material compound was moulded by an extrusion with a solidification with cooling at the outlet of the die. The size of the moulded article was the outer diameter 32 mm, the inner diameter 30 mm, and the length was cut into 22 mm. The magnetic property of the moulded article produced was Br=5.8 KG and (BH) max=7.3 MGOe.

The magnets thus produced were assembled in 25 units of DC motor, and a continuous operation test for 500 hours Test 1 was carried out.

As for a comparative example for Test 2, the raw material having the same composition was moulded by an injection in a magnetic field and a cylindrical magnet of the outer diameter 32.5 mm, the inner diameter 30 mm and the length 6 mm was moulded. The magnetic property of the moulded article produced was Br=5.7 KG and (BH) max=7.0 MGOe.

4 pieces of the magnet were stuck together by an epoxy type adhesive, and then the outer diameter and the length were made at 32 mm and 22 mm by a cutting fabrication.

The magnets were assembled in 25 units of DC motor and the 500 hour continuous operation was carried out as same as Test 1. The test results were shown in Table 1.

TABLE 1

| | DC Motor Tested (units) | DC Motor Exhibited a Deteriorated Property (units) |
|---|---|---|
| Test 1 (Example) | 25 | 0 |
| Test 2 (Comparative example) | 25 | 2 |

In the Table 1, those of which the motor showed a deteriorated property were cases that the rotation of the motor stopped or the torque was dropped due to an insufficient magnetic flux available by a delamination at the adhesive area of the magnets.

Consequently by an application of the magnet of this invention, a reliability of the motor can be improved.

EXAMPLE 2

Raw materials to make a composition Nd/13 Fe/82.7 B/4.3 were molten, were casted and a quenched ribbon was prepared in an argon atmosphere by using a quenching and a ribbon rolling machine from the ingot obtained. The quenched ribbon was coarsely crushed, was charged in a mould and a high temperature press moulding was performed by applying a pressure of 20 $Kg/mm^2$ for a short time at 700°–800° C. in an argon atmosphere. A density of the consolidated article was almost 100%.

The consolidated article was again processed with a high temperature press moulding in a vertical direction to the first pressing direction with a pressure of 10 $Kg/mm^2$ at 700°–800° C. in an argon atmosphere, (namely it was treated with a die upset)

A bulk magnet obtained was crushed to make a magnetic powder of an average particle size of 20 μm.

The magnetic powder was mixed with a resin powder comprising bisphenol. A type epoxy, novolak type epoxy and vinylbutyral-vinylalcohol copolymer, calcium stearate powder and silica powder as additives.

The ratio in the mixture was the magnetic powder 90.3 wt %, the resin powder 9.1 wt % and the additive 0.6 wt %.

The mixture was kneaded by a 2 roller type mill at 90° C. The kneaded mixture was granulated to an outer diamter of 1–10 mm granules to make a raw material compound and was moulded in a cylindrical magnet by an extrusion machine as same as Example 1, and it was cut and was fired after a demagnetization.

The size of the moulded article was the outer diameter 22 mm and the inner diameter 21 mm, and the magnetic field for the moulding was 14 KOe. The magnetic property of the moulded article obtained was Br=6.6 KG and (BH) max=9.8 MGOe.

Consequently as for the production process of this invention a high performance magnet can be obtained even a crosslinkable thermosetting resin is used.

EXAMPLE 3

A magnetic powder of an average particle size of 10 μm was prepared by the same composition and procedure as Example 1.

A coercive force iHc of this powder was 8 KOe. This is called Powder A.

Further as for the other kind of powder, a magnetic powder of an average particle size of 20 μm was prepared by the same composition and procedure as Example 2. A coercive force iHc of this powder was 12 KOe. This is called Powder B.

Powder A, nylon 12 powder and zinc stearate powder were mixed to make a ratio of 92 wt %, 7.9 wt % and 0.1 wt % respectively.

Further Powder B was also mixed with the aforementioned resin powder and the additive to make a ratio of 91 wt %, 8.8 wt % and 0.2 wt %.

These mixtures were kneaded by a two axes extrusion kneading machine at 260° C. The kneaded mixture was granulated to granules of an outer diameter of 1–10 mm to make a raw material compound 111, and a cylindrical magnet was moulded by a procedure explained in Example 1 by an extrusion moulding machine as shown in FIG. 1.

The moulding method was the same method as Example 1 and the die structure was also the same to FIG. 2 as explained in Example 1.

If a current flows in the electromagnetic coil equipped outside of the die, the magnetic flux generated flows in the arrow H in figure since it tends to pass through a magnetic material with a high magnetic permeability.

Consequently a radiated magnetic field is generated in the orientation section which is a space between a magnetic material 202*a* of the mandrel and a magnetic material ring 201*a* installed on the outer die. Therefore when a magnetic composition is passing through the orientation section, it is being moulded with a progress of an orientation of the magnetic powder.

Furthermore a magnetic field with a reverse direction to the magnetic field in the orientation section is generated in a space between the front end of the mandrel and the yoke 110 of the coil. Therefore a demagnetization of the moulded article can be achieved by making the magnetic field of this space at a suitable strength with an adjustment of a distance between the mandrel and the yoke 110.

In this example, the magnetic field for moulding was 14 KOe, the temperature of the die at the moulding was 250° C. and the cooling was applied by a forced air cooling to the outlet section of the die.

By the above, the orientated raw material compound 111 was moulded by an extrusion with a solidification with cooling at the outlet of the die. A strength of the demagnetization magnetic field was adjusted to almost the same as the coercive force iHc of the magnetic powder in the moulded article.

The size of the moulded article was the outer diameter 30 mm and the inner diameter 29 mm. In Table 2, surface magnetic flux densities for cases Test 3 and 4 in which the demagnetization was performed, and for cases Test 5 and 6 without the demagnetization are shown.

TABLE 2

| | Powder | Surface Magnetic Flux Density (G) |
|---|---|---|
| Test 3 Example | A | 20 |
| Test 4 Example | B | 35 |
| Test 5 Comparative example | A | 150 |
| Test 6 Comparative example | B | 220 |

EXAMPLE 4

A magnetic powder of an average particle size 10 μm and iHc 8 KOe was prepared by the same composition and procedure as Example 1. This powder is called Powder A.

As for the other kind of powder, a magnetic powder of an average particle size 20 μm and a coercive force iHc 12 KOe was prepared by the same composition and procedure as Example 2. This powder is called Powder B.

As same as Example 3, the Powder A was mixed with nylon 12 powder and zinc stearate powder to make a ratio of 92 wt %, 7.9 wt % and 0.1 wt % respectively.

Powder B was also mixed with the aforementioned resin powder and additive to make a ratio of 91 wt %, 8.8 wt % and 0.2 wt % respectively.

These mixture were kneaded by a two axes extrusion kneading machine at 260° C. The kneaded mixture was granulated to granules of the outer diameter 1–10 mm to make a raw material compound, and a cylindrical magnet was moulded by an extrusion moulding machine.

Figure 3:
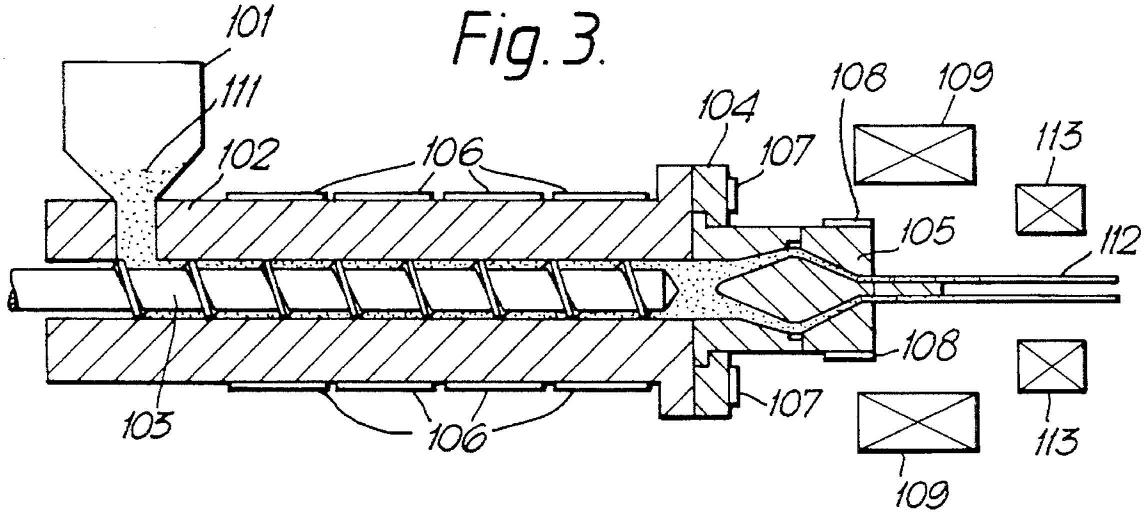
FIG. 3 is a sketch of an extrusion moulding machine used in Example of this invention.

The moulding method is explained in accordance with FIG. 3.

An extrusion moulding machine of FIG. 3 is composed of a similar constitution to an extrusion moulding machine of FIG. 1, and an electromagnetic coil 109 is positioned outside a die to charge a magnetic field in the die, but there is a difference is an electromagnetic coil for demagnetization is installed in front of it.

The aforementioned granulated raw material compound 111 was charged in the extrusion moulding machine. The raw material compound 111 was heated at 260° C. in the cylinder 102 to make it in a fluidized state, and it was passed through the die 105. The die structure was the same as explained in Example 1. According to this invention, when the magnetic composition is passed through the orientation section, it is moulded with a progress of an orientation of the magnetic powder as same to Example 3.

In this example, the magnetic field for moulding was also 14 KOe, the temperature of the die at the moulding was 250° C., and the cooling was given by a forced air cooling to the outlet section of the die. The orientated raw material compound 111 was moulded by an extrusion by a solidification with cooling at the outlet of the die.

The demagnetization was carried out by generating a magnetic field for the demagnetization by turning on an attenuated pulse current in the electromagnetic coil 113. The strength of the magnetic field for the demagnetization was 30 KOe, and it was attenuated with 800 m. sec. The magnetic field was generated in the electromagnetic coil 113 every 15 sec, and the demagnetization was carried out continuously. The size of the moulded article was the outer diameter 30 mm and the inner diameter 29 mm. Surface magnetic flux densities of the moulded articles for cases in which the demagnetization was performed (Test 7 and 8) and for cases without the demagnetization (Test 9 and 10) are shown in Table 3.

TABLE 3

| | Powder | Surface Magnetic Flux Density (G) |
|---|---|---|
| Test 7 Example | A | 10 |
| Test 8 Example | | 15 |
| Test 9 Comparative example | A | 150 |
| Test 10 Comparative example | B | 220 |

As it is clear from Table, the surface magnetic flux density which remains in the moulded article could be dropped at 6–7% by an application of the process of this invention. Consequently the workability at the cutting step, etc was greatly improved.

EXAMPLE 5

A magnetic Powder A or Powder B having the same compositions to Example 1 and 2, and Resin a (a thermosetting epoxy resin) or Resin b (a thermoplastic resin nylon 12) were weighed to make a desired volume ratio, were mixed and a sheet state compound was prepared by kneading the mixture by passing it through a gap of a twin roller mill repeatedly after charging it in the mill.

The kneading temperature of the mixture was at 90° C. when Resin a was used and at 250° C. when Resin b was used.

Then the compound was crushed into particles and was moulded by an extrusion by passing through a cylindrical die by charging it in a screw type extrusion moulding machine.

A barrel temperature of the extrusion moulding machine was at 130° C. for Resin a and at 250° C. for Resin b and the die temperature was the moulding temperature for each case.

The extrusion rate was 1 mm/sec.

The outlet temperature of the die was set at a solidification temperature of the composition moulded. This temperature differed by the processes.

Resin a was used for Process 1 and Process 2, Process 1 was a process to make the solidification with cooling at the outlet of the die, and Process 2 was a process to make the cure by heating at the front end of the die. Process 3 was a process to solidify with cooling at the outlet of the die using Resin b. The magnets thus produced were cut by method shown in Table 4.

TABLE 4

| | Cutting method |
|---|---|
| Cutting Method 1 | Cutting by melting with a heated wire |
| Cutting Method 2 | Cutting by a guillotine cutter system |
| Cutting Method 3 | Rotation saw tooth system |

Among these, Cutting Method 1 was a cutting method of this invention wherein a current is turned on in a nichrome wire of a diameter of 0.2 mm, it is contacted with a magnet when it is heated by the resistance and the magnet is cut by melting with heating.

Results of the cutting, when the magnets produced by these processes were cut, were shown in Table 5.

In this test, the magnet cut was a cylindrical magnet with the outer diameter 30 mm and the inner diameter 29 mm, and the volume ratio of the magnetic powder was 60 vol %.

Although the magnetic Powder A and B were used, both showed the same results.

TABLE 5

| | Process 1 | Process 2 | Process 3 |
|---|---|---|---|
| Cutting Method 1 | excellent | good | excellent |
| Cutting Method 2 | bad | bad | bad |
| Cutting Method 3 | ordinary | excellent | excellent |

The magnet of Process 1 was the most difficult sample to cut among the magnets of Process 1–3 because it was the most brittle. As it is clear from Table 5, the cutting method 1 and the cutting method 3 can be practiced for cutting these magnets, and it is not possible to cut it by the cutting method 2.

EXAMPLE 6

Next, results of cutting when thickness of the magnet to be moulded was changed, were shown in Table 6.

The magnets this time has an outer diameter of 30 mm, was a cylindrical magnet and the magnet prepared by Process 1 was used. The results of either the magnetic Powder A or B were the same.

TABLE 6

| | Thickness (mm) | | | | |
|---|---|---|---|---|---|
| | 1.0 | 0.7 | 0.5 | 0.1 | 0.05 |
| Cutting Method 1 | good | excellent | excellent | excellent | excellent |
| Cutting Method 2 | excellent | good | ordinary | bad | bad |

As one of the features of the extrusion moulding method, it can be enumerated that a thin thickness magnet can be moulded. Therefore it is important to cut a thin thickness magnet.

In case of the Cutting Method 3, it was difficult to cut if the thickness of the magnet became 0.5 mm or less, and it was not possible to cut when it was 0.1 mm due to a formation of cracks.

On the other hand, in case of the Cutting Method 1, a thin thickness magnet can be cut since no excess stress is applied to the magnet at the cutting step.

Consequently it is clear that the cutting by melting with a heated wire is an advantageous method for the cutting.

EXAMPLE 7

Results of the cutting when the volume ratio of the magnetic powder was changed were shown in Table 7.

The magnet cut this time had the outer diameter of 30 mm and the inner diameter of 29 mm, was a cylindrical magnet prepared by Process 1, The magnetic powder used was the magnetic Powder A

TABLE 7

| | Volume Ratio of Magnetic Powder (vol %) | | | | |
|---|---|---|---|---|---|
| | 60 | 65 | 68 | 70 | 72 |
| Cutting Method 1 | excellent | excellent | excellent | excellent | good |
| Cutting Method 2 | ordinary | ordinary | bad | bad | bad |

As the volume ratio of the magnetic powder increases, the volume ratio of the resin decreases accordingly, and the binding strength of the resin to the magnetic powder drops.

Therefore the magnet moulded becomes brittle as the magnetic powder increases. This trend is remarkable in a case of an uncured magnet produced by Process 1. As the volume ratio of the magnetic powder increases, the magnet performance of the magnet is improved, and therefore it is important that the cutting can be carried out even in a case of a large volume ratio of the magnetic powder.

In the case of Cutting Method 3, the cutting could not be practiced when the volume ratio of the magnetic powder increased.

On the other hand, in case of Cutting Method 1, the cutting can be carried out even the volume ratio of the magnetic powder is 72 vol %. Accordingly, it is clear from the results that Cutting Method 1 is a superior method for the cutting of a magnet of the extrusion.

EXAMPLE 8

An uncured cylindrical magnet was produced in accordance with followings to use it for a curing unit of this invention.

At first, 60 vol % of a magnetic powder of Sm-Co family magnet and 40 vol % of a thermosetting resin mainly comprising an epoxy resin were mixed and a compound was prepared by kneading it with a roller mill.

The epoxy resin used had a thermoplastic region of 100°–150 ° C. in which its viscosity suddenly dropped, and it was cured at a temperature of 200° C.

The compound prepared was then coarsely crushed and it was charged in a moulding machine.

As for the moulding machine, an injection moulding machine and an extrusion moulding machine could be used, but the extrusion moulding machine was used here. The charged compound was heated at 100°–150° C. in the moulding machine to make it in a molten state, the magnetic powder was orientated in a die, the molten mixture was solidified with cooling as its state and an uncured cylindrical magnet was prepared after a demagnetization.

The size of the magnet was the outer diameter 32.8 mm and the inner diameter 31.8 mm, and it was cut to make its length at 100 mm.

In Table 8, a comparison of various curing processes Test 11–13 for the aforementioned uncured cylindrical magnet is shown.

TABLE 8

| | Shape | Operability | Cost |
|---|---|---|---|
| Test 11 | excellent | good | good |
| Test 12 | excellent | ordinary | ordinary |
| Test 13 | bad | excellent | excellent |

Test 11 is the results of the curing process of this invention for a cylindrical magnet. Namely the outer circumference of the uncured cylindrical magnet is fixed by a jig, and the inner circumference is fixed by an elastic material, in this case it was a silicone rubber (hereinafter called as an inner body) expanded with a gas (in this case it was air), and it is cured by heating in an oven.

Test 12 is a conventional process in which the outer circumference is fixed with a jig, a rotation unit is attached to the jig, and it is cured by heating with a rotation in the circumferential direction. Test 13 is a process to cure the cylindrical magnet by heating by placing it in an oven as it is without the fixing.

The thermocuring condition here was at 200° C. for one hours in $N_2$ atmosphere. The shape in Table was the shape of the magnet after the cure.

In case of Test 13, the magnet after the cure is completely deformed and it is obvious that the fixing of the shape is necessary at the thermocuring step. On the other hand, in cases that the shape is fixed, the cylindrical form is nearly kept, and thus Test 11 and Test 12 are useful process from a viewpoint of the shape.

The operability means an easiness of the operation of the unit and its capability for processing a large amount of the sample.

In case of Test 12, it takes more time for an operation to connect the jig with the rotation unit than an operation of Test 11 to insert the inner body when compared with Test 11 of this invention. Furthermore from a viewpoint of cost, Test 12 is more costy because of the requirement of the rotation unit. Consequently the Test 11 process is a superior process to Test 12 and 13.

Next the dimension accuracy after the cure when it is cured by heating by Test 11 and Test 12 is shown in Table 9.

TABLE 9

| | Straightness | Roundness |
|---|---|---|
| Test 11 | 0.005 | 0.01 |
| Test 12 | 0.07 | 0.04 |
| Before the cure | 0.08 | 0.05 |
| | | (Unit: mm) |

The rotation rate of Test 12 here was 500 rpm. This is the maximum rate which can be practiced by taking the cost into consideration.

The airpressure of the inner body of Test 11 was 1 atm.

The magnet before the cure was prepared by somewhat decreasing its dimension accuracy in order to check a correction ability on the dimension by the curing process by heating.

From Table 9, it is understood that the dimension accuracy in corrected by the curing process by heating such as Test 11 and Test 12.

This is because that in case of Test 11 the air in the inner body is expanded in the atmosphere of the thermocuring, it applies a force to the magnet resulting the correction of the dimension of the magnet while it is in a thermoplastic state.

As for Test 12, a centrifugal force generated by the rotation has a similar action, but the dimension accuracy by the correction of Test 11 is further improved.

This is because that the force by expansion of the air is stronger than the centrifugal force resulting better correction of the dimension. From the correction ability of the dimensions, it is also understood the process of Test 11 of this invention is superior.

EXAMPLE 9

Raw materials to make the same composition of Powder A in Example 3, Sm (CO 0.672 Cu 0.08 Fe 0.22 Zr 0.028) 8.35 were molten, an ingot produced was magnetically cured by a heat treatment after casting, and a magnetic powder having the average particle size of 10 μm and the coercive force 1Hc of 10 KOe was obtained by crushing the said ingot.

The powder was mixed with nylon 12 powder and zinc stearate powder to make a ratio of 92 wt %, 7.9 wt % and 0.1 wt % as same to Example 3.

Figure 4:
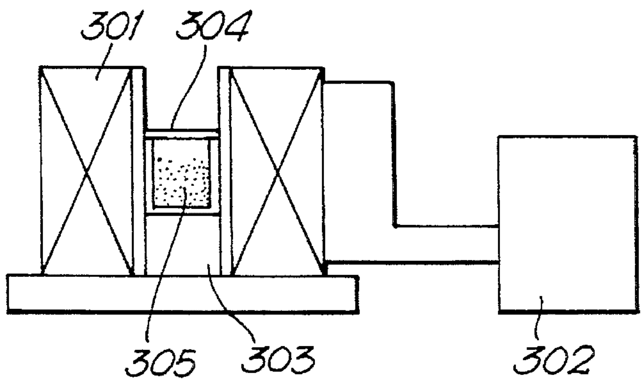
FIG. 4 is a sketch of a pulse magnetization unit used in Example of this invention.

The mixture was magnetized by a pulse magnetization unit shown in FIG. 4 with using a magnetic field of 25 KOe, and it was then kneaded by a two axes extrusion kneading machine at 26° C.

In FIG. 4, 301 is an electromagnetic coil, 322 is a pulse current generation power source, 303 is a table to adjust a hight of a sample and 305 is a raw material magnetic powder.

The kneaded mixture was granulated to particles of the outer diameter of 1–10 mm to make a raw material compound, and a cylindrical magnet was moulded by using the extrusion moulding machine shown in FIG. 1 and the die shown in FIG. 2 with a same procedure described above.

In this example, the die temperature at the moulding was 250° C., and a cooling was carried out by a forced air cooling at the outlet of the die.

Accordingly, an orientated raw material compound was moulded by an extrusion by a solidification with cooling at the outlet of the die.

The size of the moulded article was the outer diameter 33 mm and the inner diameter 32 mm.

Figure 5:
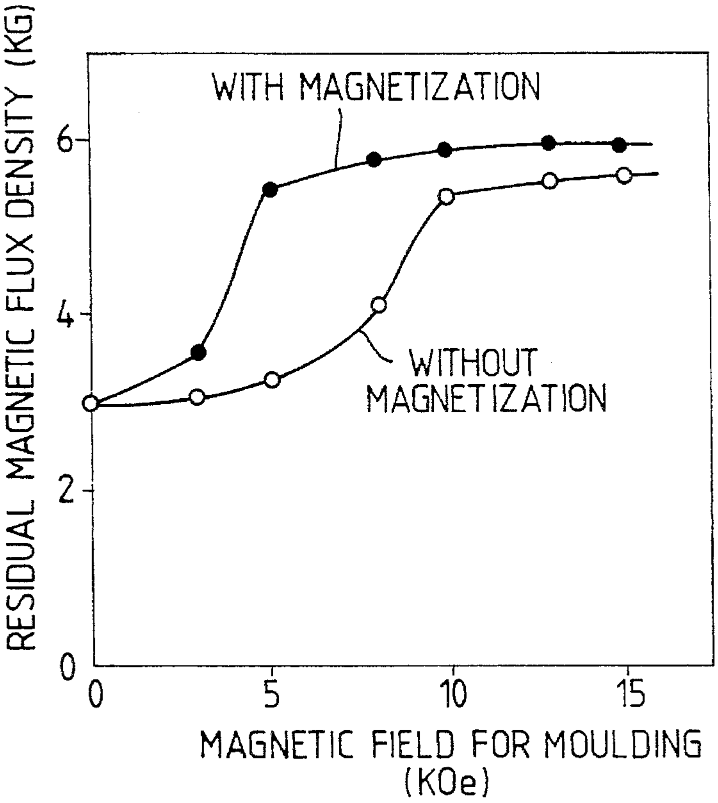
FIG. 5 is a graph showing a relation between a magnetic field for the moulding and a residual magnetic flux density of the moulded article for cases with and without a magnetization of a magnetic powder prior to the moulding.

In FIG. 5, a comparison of changes of residual magnetic flux density (Br) with magnetic fields for moulding for cases with and without magnetization of the raw material powder before the moulding is shown.

From FIG. 5, it is understood that a magnet with a high Br ie with a high degree of the orientation can be prepared by an adoption of the magnetization for the powder prior to the moulding even if the magnetic field for the moulding is low.

Furthermore as for the magnet performance at the high magnetic field (around 15 KOe) for the moulding, the cases with the magnetization showed higher values, and it was understand that the magnetization for the powder prior to the moulding had a bigger effect.

EXAMPLE 10

Raw materials were molten to make a composition of Sm 0.5 Pr 0.5 (Co 0.672 Cu 0.08 Fe 0.22 Zr 0.028) 8.35, an ingot produced was magnetically cured by a heat treatment after casting, and magnetic powders having an average particle size of 10 μm were obtained by crushing the ingot.

Two kinds of magnetic powders having the coercive force iHc 7 KOe and 10 KOe respectively were prepared by changing a condition of the heat treatment.

These powders were mixed with nylon 12 powder and zinc stearate powder to make a ratio of 92 wt %, 7.9 wt % and 0.1 wt % respectively.

These magnetic powders were magnetized by using a direct current electromagnet unit, and then they were kneaded by a two axes extrusion kneading machine at 260° C.

Figure 6:
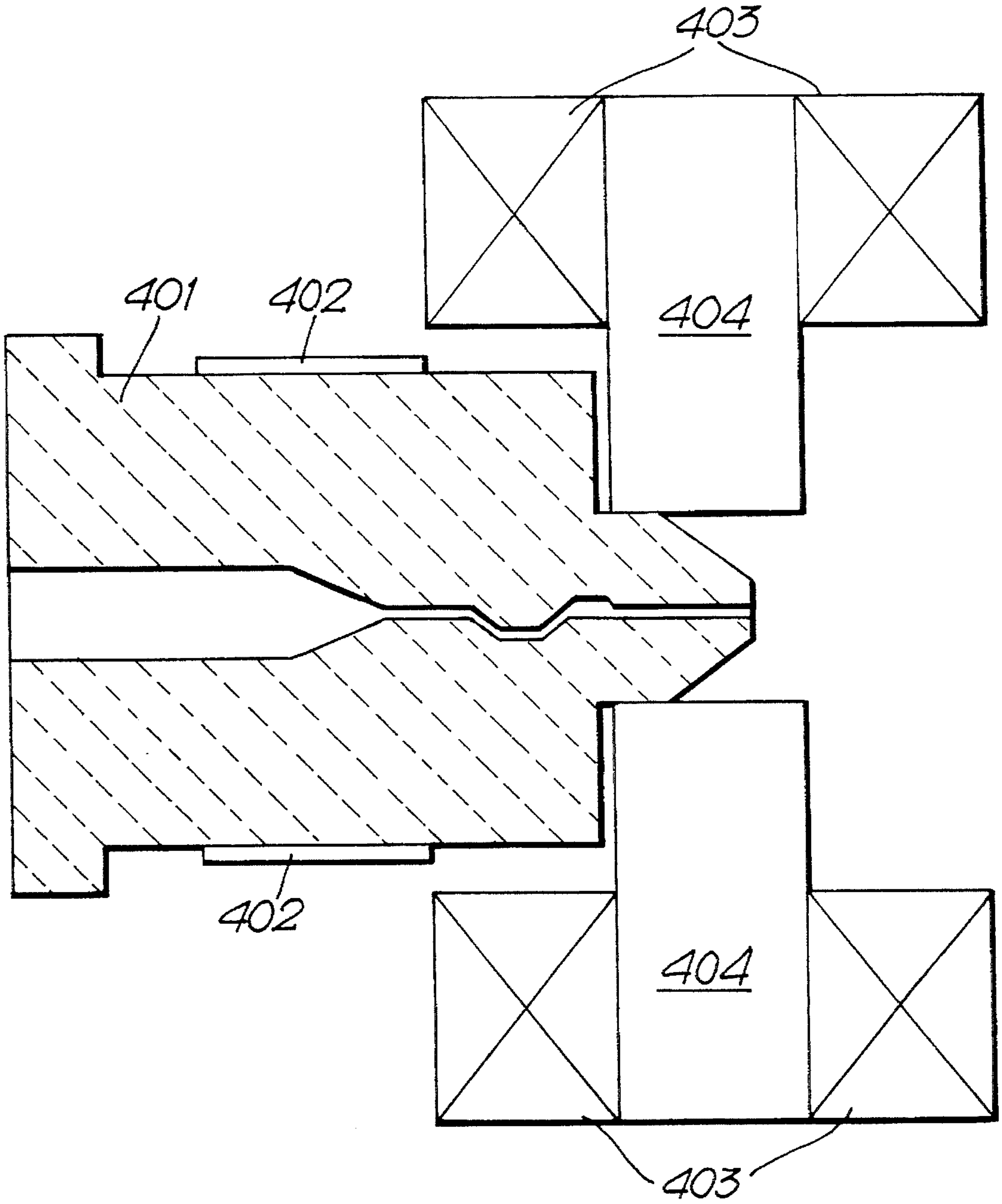
FIG. 6 is a sketch of a die structure for an extrusion moulding in a magnetic field of a thin plate state resin bound type magnet used in Example of this invention.

The kneaded mixtures were granulated to particles of the outer diameter 1–10 mm to make a raw material compound, and were moulded by an extrusion into thin plate state magnets by using a die shown in FIG. 6.

In the die 401, when a current is turned on in an electromagnetic coil 403, a magnetic field vertical to the passage of a compound in the die in generated between the upper and the lower pole pieces 404. Therefore a thin plate state magnet having an orientation of the magnetic powder to the thickness direction is moulded. By the way, 402 is a heater.

The size of the moulded article was the width of 60 mm and the thickness of 1 mm, and the strength of the magnetic field at the moulding was 12 KOe.

Figure 7:
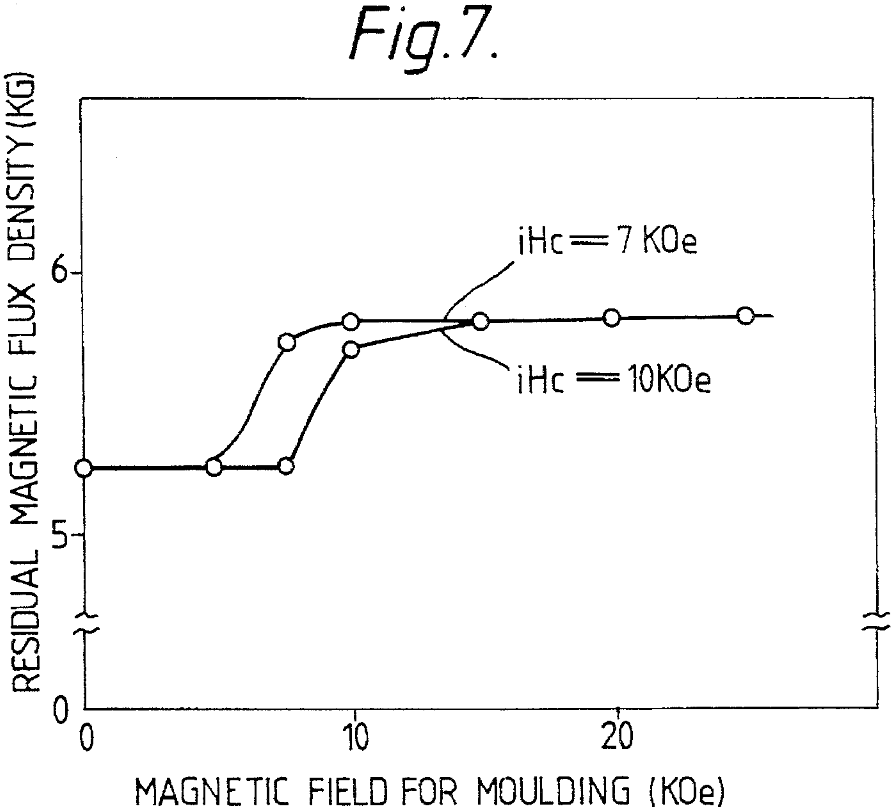
FIG. 7 is a graph showing a relation between a magnetic field for magnetization before the moulding and a resudial magnetic flux density of the moulded article.

FIG. 7, a relation between the strength of the magnetic field for the magnetization prior to the moulding, and the residual magnetic flux density of the moulded article is shown.

From the graph, it was understood that though there was no effect of the magnetization prior to the moulding if it was done in a magnetic field which was weaker than the coercive force of the magnetic powder, there was an effect to improve the magnetic performance if it was done in a magnetic field stronger than the coercive force.

EXAMPLE 11

Raw materials were molten to make a composition of Nd 13 Fe 82.7 B 4.3, were casted, and a quenched ribbon was prepared in an argon atmosphere by using a quenching and ribbon rolling machine for the ingot produced.

The quenched ribbon was coarsely crushed, it was filled in a mould and a high temperature press moulding was carried out in an argon atmosphere at 700°–800° C. with a pressure of 20 $Kg/mm^2$ for a short time.

The consolidated article obtained had a density almost 100%. The consolidated article obtained was moulded again by the high temperature press moulding in a vertical direction to the initial pressing direction in an argon atmosphere at 700°–800° C. with a 10 $kg/mm^2$ pressure (Namely, a die upset was carried out).

A bulk state magnet obtained was crushed and a magnetic powder of an average particle size of 20 μm was obtained. The coercive force of the magnetic powder was 12 KOe.

The magnetic powder was mixed with a resinous powder comprising bisphenol A type epoxy, novolak type epoxy and vinylbutyral-vinylalcohol copolymer, calcium stearate powder and silica powder as additives to make a ratio the magnetic powder 90.3 wt %, the resin powder 9.1 wt % and the additive 0.6 wt % respectively.

The mixture was magnetized with a 35 KOe magnetic field by using a pulse magnetization unit and it was kneaded by a two roller type mill at 90° C. The kneaded mixture was granulated to an outer diameter of 1–10 mm granules to make a raw material compound and was moulded in a cylindrical magnet by an extrusion machine as same as Example 9.

In this example, the die temperature at the moulding was 140° C., and the strength of the magnetic field for the moulding was 8 KOe.

The size of the moulded article was the outer diameter 8 mm and the inner diameter 6 mm. The moulded article was cut in a suitable length, was demagnetized and was fired in conditions of 200° C.×45 minutes.

The magnetic property of the moulded articles obtained in Test 13–15 is shown in Table 10. Test 14–15, the comparative examples, illustrate a magnetic property of sample moulded with the magnetic field for the moulding at 8 KOe without the magnetization prior to the moulding (Test 14) and a sample magnetic property moulded with the magnetic field for the moulding at 15 KOe and a die of which the orientation section at the front end was shortened (Test 15).

| | Test 10 | |
|---|---|---|
| | Br (KG) | (BH) max (MGOe) |
| Test 13 | 7.0 | 10.4 |
| Test 14 | 4.3 | 3.5 |
| Test 15 | 5.1 | 4.9 |

As it is clear form Table 10, almost no orientation is observed in comparative example Test 14, and the magnet obtained merely shows a performance close to an isotropic one.

On the contrary a high performance magnet with a sufficient orientation is obtained by this example.

In the case of Test 15, the magnetic property is low in spite of its high magnetic field for the moulding, and it is considered that a sufficient orientation of the magnetic powder is not attained at the moulding since the length of the orientation section becomes extremely short such as 1 mm or less in order to charge a 15 KOe magnetic field at the orientation section due to its very fine cylindrical form having the inner diameter of the moulded article being 6 mm.

Therefore a moulding process of this invention is a very effective process for a case in which a high magnetic field for moulding is not attained because of a limitation of a moulded article or a structural problem of a die.

EXAMPLE 12

In this invention, Powder A and B were prepared by the same composition and procedure to Example 4, they were kneaded with the resin, and cylindrical magnets were moulded by an extrusion moulding machine after granulating the kneaded mixture to particles having the outer diameter 1–10 mm to make a raw material compound. The moulding process is briefly explained by using FIG. 8.

Figure 8:
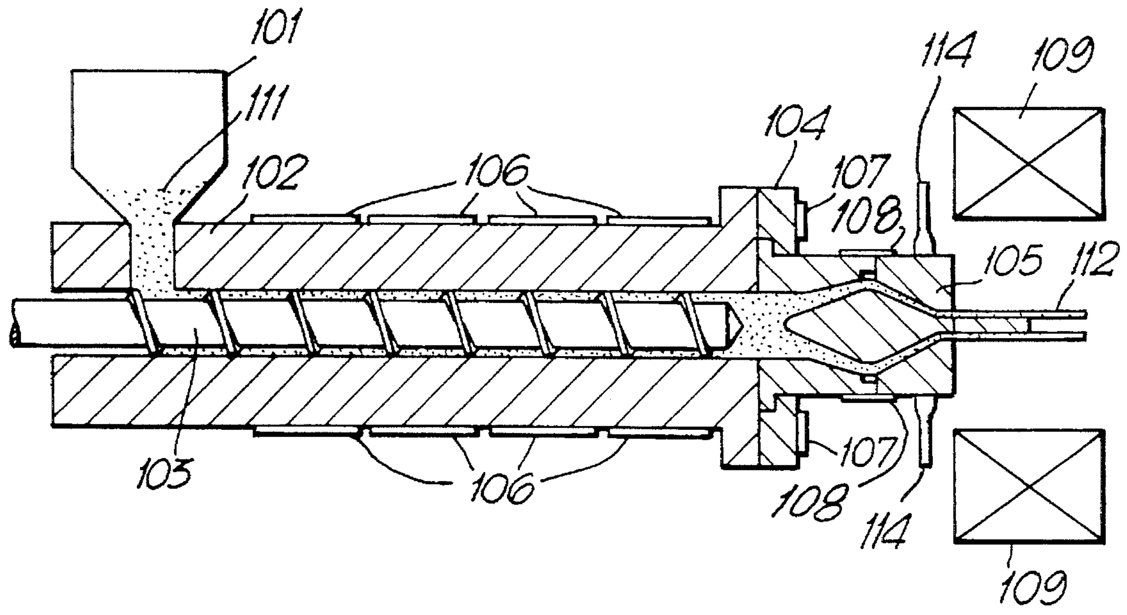
FIG. 8 is a sketch of an extrusion moulding machine used in Example of this invention.

An extrusion moulding machine of FIG. 8 has a similar composition to the extrusion moulding machine of FIG. 1. However, at the front end of the die, 4 pieces of ultrasonic oscillator (Langevin type) 114 are installed to generate a slight vibration.

The aforementioned granulated raw material compound 111 was charged to the extrusion moulding machine of FIG. 8. The raw material compound was heated in the cylinder 102 at 260° C. to make it in a fluidized state and it was passed through the die 105.

The die structure was the same as FIG. 2 explained in Example 1.

In this example, the magnetic powder is moulded while it is being orientated when the magnetic composition passes through the orientation section. The slight vibration from the ultrasonic oscillator was transmitted to the front end of the die.

In this example, the magnetic field for the moulding was 10 KOe, the die temperature at the moulding was 205° C. and the cooling was applied by a forced air cooling to the outlet of the die. Thus the orientated raw material compound was solidified with cooling at the outlet of the die and was moulded by an extrusion. The size of the moulded article was the outer diameter of 25 mm and the inner diameter of 23 mm.

Differences of the magnet performance of the moulded article the moulding rate are shown in Table 11 for cases of an application of the slight vibration (Test 16, 17) and for cases of no application (Test 18, 19). Test 16 and 17 are the cases with the slight vibration and Test 18 and 19 are the cases without it.

TABLE 11

| | Powder | (BH) max (MGOe) | Moulding Rate (mm/sec) |
|---|---|---|---|
| Test 16 | A | 7.5 | 2.5 |
| Test 17 | B | 10.2 | 2.0 |
| Test 18 | A | 6.7 | 1.8 |
| Test 19 | B | 8.5 | 1.5 |

As it is clear from Table 11, examples with the slight vibration show an improvement in both the magnetic property and the moulding rate. It is considered that it is due to an improved orientation by facilitating a rotation of the magnetic powder by the application of the slight vibration at the moulding.

Furthermore it can also be said that the moulding rate is improved by a reduction of the extrusion resistance by the slight vibration. The reason for the low magnetic property in comparative examples was that the magnetic powder did not sufficiently orientated because the magnetic field for the moulding which was able to charge was only 10 KOe.

Therefore the moulding process of this invention is a particularly effective process for the case in which a high magnetic field for the moulding can not be attained due to shapes of the die or the moulded article.

EXAMPLE 13

Table 12 shows how much degree of the thickness is mouldable without a post fabrication step in each moulding method of an extrusion moulding method, a press moulding method and an injection moulding method.

TABLE 12

| | Thickness [mm] | | | | |
|---|---|---|---|---|---|
| Moulding Method | 1.0 | 0.9 | 0.7 | 0.1 | 0.01 |
| Extrusion Moulding | P | P | P | P | P |
| Press Moulding | P | P | I | I | I |
| Injection Moulding | P | P | I | I | I |

P = possible
I = impossible

Magnets prepared here was ring shaped with the outer diameter of 30 mm, and the mouldings were performed so that the magnets would have thickness as shown in Table 12.

The magnetic powder used was Sm-Co family rare earth magnetic powder and as for the resin, nylon 12 was used for the extrusion moulding method and the injection moulding method, and an epoxy resin was used for the press moulding method.

The mixing ratio of the magnetic powder and the resin was 90 wt %: 10 wt % for the extrusion moulding method and the injection moulding method, and 98 wt % : 2 wt % for the press moulding method.

As it is understood from Table 12, the moulding was not be able to perform if the thickness of the magnetic moulded article became thin for the press moulding method and the injection moulding method. This was due to a difficulty to fill the magnetic powder in a cavity if the thickness became thin for a case of the press moulding method, and is case of the injection moulding method, it could also not be moulded because of a difficulty to inject a molten mixture of the magnetic powder and the resin in a cavity.

On the other hand, in case of the extrusion moulding method, a thin thickness magnet can be moulded because it is moulded by continuously flowing a molten mixture of the magnetic powder and the resin and by gradually converging the molten mixture. Accordingly it is clear that the extrusion moulding method is an effective method to mould a thin thickness magnet having the thickness of 1 mm or less.

EXAMPLE 14

Next, the effects on moulding radial magnet with a thin thickness by changing the magnetic powders are shown in Table 13.

The magnet moulded was a ring shaped magnet with an outer diameter of 32.8 mm, the inner diameter of 31.8 mm and the thickness of 0.5 mm, and it was moulded by extrusion.

The compound used comprised 60 vol % of a magnetic powder and 40 vol % of a resin and nylon 12 was used for the resin.

Further as for the magnetic powder, a rare earth magnet having a composition of 8 m (Co 0.672 Cu 0.08 Fe 0.22 Zr 0.028) 8.35 was used, it was adjusted to make the average particle size r for each test of Test 20–24 and for comparative examples Test 25–27, and the results are shown in Table 13.

As shown in Table 13, there was a change of the magnet performance of the magnet moulded by changing the average particle size r of the magnetic powder. By making the average particle size r of the magnetic powder small, the magnet performance of the magnet is improved.

And a sufficient magnet performance was obtained when the average particle size r was not more than 1/10 of the thickness of the magnet moulded article.

However in case when the average particle size is not less than 1/10 of the thickness of the magnet, the magnet performance is low.

TABLE 13

| Test No. | r [μm] | BR [KG] | (BH) max [MGOe] |
|---|---|---|---|
| 20 | 50 | 5.88 | 7.5 |
| 21 | 20 | 5.95 | 7.8 |
| 22 | 10 | 6.18 | 8.1 |
| 23 | 1 | 6.33 | 8.5 |
| 24 | 0.1 | 6.16 | 8.0 |
| 25 | 70 | 5.60 | 6.5 |
| 26 | 100 | 5.01 | 5.2 |
| 27 | 150 | 4.70 | 4.5 |

The reason why the above results were obtained is, in case of the extrusion moulding, the magnetic powder in the molten mixture of the magnetic powder and the resin was orientated at a section in which a magnetic field was charged by passing through the passage of a die, and the moulded article was extruded outside the die after solidifying it by cooling in the die and keeping the state as it is. Accordingly the molten mixture received a friction force at the contact section with the die. Thus the orientation of the magnetic powder at the contact surface of the molten mixture with the die might be disordered by the friction force while it was being solidified with cooling even though the magnetic powder was once orientated in the die.

When a thin plate state magnet is moulded, the effect of the layer where the orientation is disordered becomes significant, the thickness of the layer is related with the particle size of the magnetic powder as well, and as the results the average particle size gives an influence to the magnet performance of the magnet.

As it is clear from Table 13, in order to reduce the influence of the particle size, it is appropriate that the average particle size r of the magnetic powder is 1/10 or less of the thickness of the magnetic moulded article.

EXAMPLE 15

An alloy having a composition of Nd 14 Fe 81 B 5 was molten in a crucible, it was cooled rapidly by a meltspan method and a thin piece was prepared. The thin piece was crushed till it had an average particle size of 35 μm, and treatments shown in Table 14 were processed thereafter.

TABLE 14

| | Treatment |
|---|---|
| Treatment 1 | Cobalt-phosphorus-chromium plating |
| Treatment 2 | $SiO_2$ coating |

Treatment 1 was that after crushing the magnetic powder, a cobalt-phosphorus plating was carried out in a sodium hypophosphite reduced ammonia, alkaline cobalt plating bath, then a chromate treatment was performed by putting the magnetic powder in a potassium dichromate solution and a cobalt plating layer was formed on the magnetic powder.

Treatment 2 was that pure water adjusted its pH with hydrochloric acid was mixed with tetramethoxysilane to make an approximate molar ratio of 4:1, and a hydrolysis was carried out by adding ethanol to it. After the decomposition and an addition of a surfactant, the magnetic powder was added and was stirred for a predetermined time.

Then the magnetic powder was separated from the solution, was dryed and a heat treatment was performed to form $SiO_2$ film on the magnetic powder.

After the surface treatment, the magnetic powder and the resin for making a ratio of 60 vol % and 40 vol % were weighed and were mixed, and after the mixing, it was charged in a kneading machine to knead it and a compound was prepared.

The kneading machine herewith used was a roller mill. Further as for the resin used, two kinds of resin were used. One was Resin a which was copolymer mainly comprising a thermosetting type epoxy resin, and the other Resin b was a thermoplastic polyamide resin (nylon 12).

After crushing the compound produced, it was moulded by an injection moulding machine or an extrusion moulding machine. In case that Resin a was used, the moulded article was heated to cure the resin after the moulding.

In order to check in which step the film tended to be removed, a coverage rate was determined by taking a sample before and after each step in the total process.

The magnetic powder used here was a plating-treated one with the plating thickness of 1 μm, and the moulding was carried out by an extrusion moulding machine. The results are shown in Table 15.

The results were the same for either the case of Resin a and b. From Table 15, it is clear that the film coverage rate suddenly dropped between before and after the kneading. In other steps, the drop of the coverage ratio was small, and it was considered that it was due to a protection of the coated film by the mixed resin especially after the kneading.

TABLE 15

| Step | Coverage Rate (%) |
|---|---|
| Before mixing | 100 |
| After mixing (Before kneading) | 95 |
| After kneading (Before crushing) | 50 |
| After crushing (Before moulding) | 48 |
| After moulding | 46 |

On the other hand, before kneading, the solid resin and magnetic powder are merely mixed, the resin does not give the protection for the coated film, and therefore the coated film is removed by a strong stress to the magnetic powder applied during the kneading.

Accordingly the mixture of the magnetic powder and the resin was heated before the kneading, and then the kneading was carried out. The coverage rates after the kneading which was carried out after heating at various temperatures are shown in Table 16.

The magnetic powders herewith used were that plating-treated of the plating thickness of 1 μm for Test 28–33, and for Test 34 et seq. thereafter were $SiO_2$ coated.

Resin a of a thermosetting resin was used for the resin. The coverage rate after the kneading was calculated setting the coverage rate before the kneading (after mixing) as 100, and the viscosity was a viscosity at a shear rate 1000 $sec^{-1}$ when the mixture was heated at the temperature indicated.

TABLE 16

| Test | Temperature (°C.) | Viscosity [kpoise] | Coverage Rate [%] |
|---|---|---|---|
| 28 | Room Temperature | — | 50 |
| 29 | 50 | 500 | 50 |
| 30 | 75 | 300 | 74 |
| 31 | 85 | 180 | 90 |
| 32 | 100 | 70 | 94 |
| 33 | 120 | 10 | 98 |
| 34 | 50 | 500 | 60 |
| 35 | 75 | 300 | 85 |
| 36 | 85 | 180 | 93 |
| 37 | 100 | 70 | 98 |
| 38 | 120 | 10 | 98 |

From Table 16, the mixture may have the viscosity by heating it. It is clear that the coverage rate is improved when the kneading is performed after heating the mixture to put it in a state in which it has the viscosity. Although the coverage rate of the plated magnet becomes worse than that of the $SiO_2$ coated magnet when compared in the same condition because weak adhesion of the film, an improvement is seen when the viscosity reaches 300 kpoise, and below this, the coated film was sufficiently protected.

It is considered that the above results are obtained because as to the removal of the film during the kneading, the removal is largely influenced by a stress of the roller when the roller is applied to a state in which a sufficient heating is not given when the mixture is charged in the kneading machine, and the influence is relieved by giving the viscosity to the mixture.

Next an oxidation resistance of a magnet produced by the production process of this invention was investigated. The results of Test 39 and 40 as this Examples and Test 41 and 42 as comparative examples are shown in Table 17.

TABLE 17

| Test | Surface Treatment | Oxidation Resistance |
|---|---|---|
| 39 | Treatment 1 | A |
| 40 | Treatment 2 | A |
| 41 | Treatment 1 | C |
| 42 | Treatment 2 | B |

A = Excellent
B = Good
C = Bad

Test 41 and 42 of the comparative examples were the cases in which the kneading was carried out without heating before the kneading, and Test 39 and 40 of Examples were carried out by heating at 100 kpoise.

The oxidation resistance was a result after storing the sample in a constant temperature and constant humidity oven at 80° C. ×95% for 100 hours.

It is clear that the oxidation resistance is improved by the heat treatment before the kneading.

EXAMPLE 16

Raw materials to make a composition of Sm (Co 0.672 Cu 0.08 Fe 0.22 Zr 0.028) 8.35 were molten, were casted, an ingot produced was magnetically cured by a heat treatment, and then a magnetic powder having an average particle size of 10 μm was obtained by crushing it.

The powder was mixed with nylon 12 powder and zinc stearate powder to make a ratio of 92 wt %, 7.8 wt % and 0.1 wt %, respectively.

The mixture was then kneaded by a two axes extrusion kneading machine at 260° C. The kneaded mixture was granulated to particles of the outer diameter of 1–10 mm to make a raw material compound, and a cylindrical magnet was moulded by an extrusion moulding machine.

Figure 10:
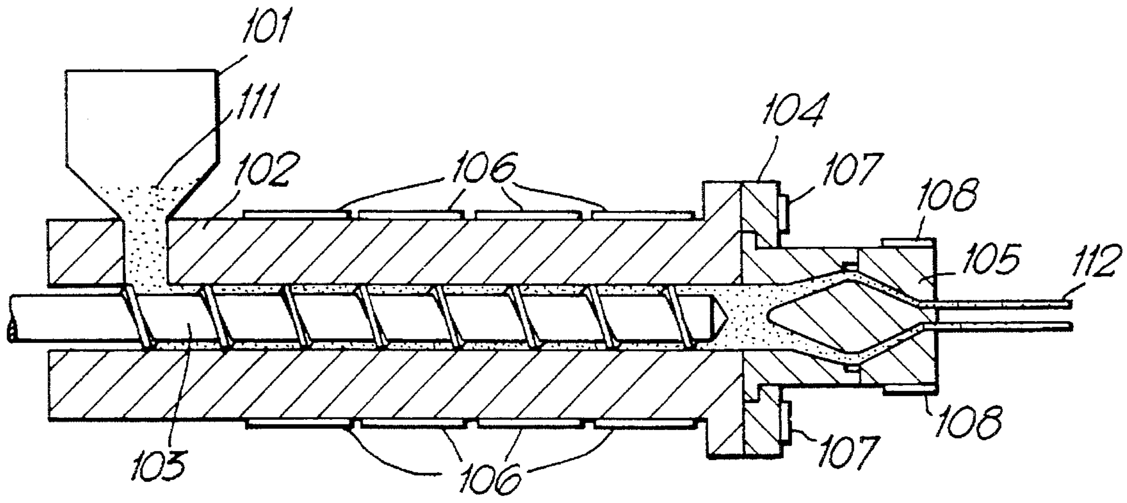
FIG. 10 is a sketch of an extrusion moulding machine used in Example 16 and 17 of this invention.

The moulding method is explained in accordance with FIG. 10.

As shown in FIG. 10, the extrusion moulding machine includes a hopper 101 which is a section of charging material, a cylinder 102, a screw 103, an adaptor plate 104 to install a die to the cylinder section 102, a die 105 and a driving motor for the screw (which is not shown in Figure).

The aforementioned granulated raw material compound 111 was charged in the extrusion moulding machine. The raw material compound 111 was heated in the cylinder 102 at 260° C. to make it in a fluidized state, and it was passed through the die 105.

In this Example, the die temperature at the moulding was 250° C., and the cooling was carried out by a forced air cooling at the outlet section of the die. The size of the moulded article produced was the outer diameter of 33 mm and the inner diameter of 32 mm.

Figure 11:
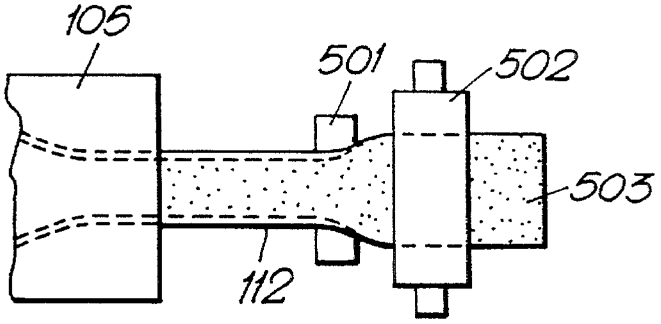
FIG. 11 is a sketch of Example to cut and to make a thin plate state of a cylindrical resin bound type magnet moulded by an extrusion in Example 16.

The moulded article was made in a thin plate state by a unit shown in FIG. 11.

FIG. 11 is a drawing viewed from the top, the cylindrical moulded article 112 extruded from the die 105 was split into two equal sections, the top and bottom, by the cutter 501 installed in front of the die 105, and the bisected moulded articles were moulded into thin plate state magnet by passing between two sets of two rollers 502 positioned in the rearward section of the cutter 501.

Then the end surfaces of the thin plate state magnet 503 was cut to make it a desired size. The size of the moulded article was the width of 50 mm and the thickness of 1 mm. The magnetic property of the moulded article obtained is shown in Table 18.

As a comparative example, a thin plate state moulded article was moulded by an extrusion by using a die which was generally used for an extrusion moulding of a thin plate state plastic, and its magnetic property is shown as Test 44.

As for the raw material compound, the same magnetic powder, nylon 12 powder and zinc stearate powder as Test 43 of Example were mixed to make a ratio of 91.5 wt %, 8.3 wt % and 0.2 wt % respectively, they were kneaded, were granulated, and were moulded for the determination of the magnetic property. The size of the moulded article was the same as Test 43.

In Table 18, a mouldability of Example of this invention (Test 43) and the comparative example (Test 44) is also shown with the magnetic property.

TABLE 18

| | (BH) max (MGO2) | Mouldability |
|---|---|---|
| Test 43 (Example) | 2.5 | G |
| Test 44 (Comparative example) | 2.4 | O |

G = Good
O = Ordinary

As it is clear from Table 18, there is no significant difference on the magnetic property between Test 43 of Example and Test 44 of the comparative example, and a magnet, having its magnet performance equal to or above those obtained by the conventional moulding method, can be moulded.

On the other hand, from a viewpoint of the mouldability, it was difficult to achieve a stable moulding for Test 44 of the comparative example, and a rate of an rejected article was high. Furthermore the fabrication cost of the die used in Test 44 of the comparative example was approximately 3 times higher than the die of Test 43 of example, and it was more expensive than a total cost of the die and the press unit of example. Accordingly, a high performance thin plate state resin bound type rare earth magnet can be produced with a high productivity by using the moulding method of this invention.

EXAMPLE 17

Raw materials to make a composition of Nd 14 (Fe 0.95 Co 0.05) 80.5 B 5.5 were molten, were casted and a quenched ribbon was prepared in an argon atmosphere by using a quenching and ribbon rolling machine from the ingot obtained.

The quenched ribbon was crushed and a magnetic powder of an average particle size of 20 μm was obtained.

This magnetic powder was mixed with a resin powder comprising bisphenol A type epoxy, novolak type epoxy and vinylbutyral-vinylalcohol copolymer, calcium stearate powder and silica powder as additives to make a ratio of 90.3 wt %, 9.1 wt %, 0.4 wt % and 0.2 wt % respectively.

The mixture was kneaded by a two roller type mill at 90° C. The kneaded mixture was granulated to outer diameter of 1–10 mm particles to make a raw material compound and was moulded in a cylindrical magnet by using the extrusion moulding machine shown in FIG. 10 of the aforementioned Example 16.

After the moulded article was cut into an appropriate length, one point on the circumference of the moulded article was also cut in parallel with its central axis.

Figure 12:
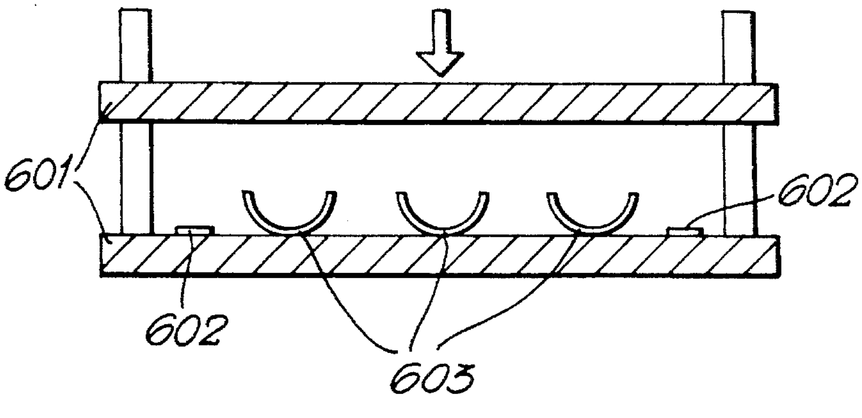
FIG. 12 is a sketch of a press unit for moulding of a thin plate state magnet used in Example 17 of this invention.

The moulded article was fired at 200° C. for 45 minutes while it was being pressed to make a thin plate state by a press unit shown in FIG. 12.

The press unit shown in FIG. 12 is to press a moulded article by moving the press plate 601 located in upper position downward as shown by an arrow. The thickness of the moulded article 603 is adjusted by a spacer 602.

The press unit was placed in a firing furnace, was heated and the aforementioned moulded article was set on the press plate 601.

A press was carried out to make a thin plate state when the viscosity of the moulded article dropped, and it was further heated to crosslink the organic resin in the moulded article.

Lastly, the edges of the moulded article were cut and a thin plate state magnet with the desired size was prepared. The magnetic property and the surface condition of the thin plate state moulded articles of Test 49–53, in which the sizes of the moulded article extruded by an extrusion were altered, were shown in Table 19.

TABLE 19

| Test No | Outer Diameter (mm) | Inner Diameter (mm) | d/D | (BH) max (MGOe) | Surface Condition |
|---|---|---|---|---|---|
| 49 | 22 | 22 | 0.91 | 5.0 | Good |
| 50 | 22 | 18 | 0.82 | 4.9 | Good |
| 51 | 22 | 16 | 0.73 | — | Bad |
| 52 | 33 | 25 | 0.76 | 4.9 | Good |
| 53 | 33 | 23 | 0.70 | — | Bad |

In Table 19, the "Bad" mark under surface condition means that it is not usable as a magnet because of the formation of cracks on the surface.

As is clear from Table 19, if the ratio d/D between the outer diameter (D) and the inner diameter (d) is below 0.75, it can not be used as a magnet. It is considered that this is due to formation of cracks on the surface by stress when it is treated to make a thin plate state since the thickness of the cylindrical moulded article is thick relative to the outer diameter.

Concerning the magnetic property, there is no problem if d/D is 0.75 or more.

Accordingly in the moulding method of this invention when d/D is limited as $$0.75 \leq d/D < 1,$$

a magnet having a high magnetic property without defects such as crack, etc can be produced.

EXAMPLE 18

Raw materials to make a composition of Sm (Co 0.672 Cu 0.08 Fe 0.22 Zr 0.028) 8.35 were molten, were cast, an ingot produced was magnetically cured by a heat treatment, and then a magnetic powder having the average particle size of 10 μm was prepared by crushing the ingot.

This powder was mixed with nylon 12 powder and zinc stearate powder to make a ratio of 92 wt %, 7.8 wt % and 0.2 wt % respectively.

Then the mixture was kneaded by a two axes extrusion kneading machine at 260° C. The kneaded mixture was granulated to particles having the outer diameter of 1–10 mm to make a raw material compound, and a cylindrical magnet was moulded by an extrusion moulding machine shown in FIG. 1.

The moulding method was the same method as in Example 1.

Being the same as FIG. 1, the extrusion moulding machine consists of a hopper 101 ie a raw material charging section, a cylinder 102, a screw 103, an adaptor plate 104 to equip a die at the cylinder, the die 105 and a driving motor for the screw (which is not shown in figure), and further an electromagnetic coil 109 to charge a magnetic field in the die 105 is positioned at the outside of the die 105. 106, 107 and 108 are heaters.

The aforementioned granulated raw material compound 111 was charged in the extrusion moulding machine. The raw material compound was heated in the cylinder 102 at 260° C. to make it in a fluidized state, and was passed through the die 105 of which structure was shown in FIG. 2.

The die is constituted by an outer die 201 and a mandrel 202. The outer die is made of a non-magnetic material, but a ring shaped magnetic mateial 201a is installed at the front end to induce a magnetic flux. The mandrel 202 is also made of a non-magnetic mateial, and at its front end a magnetic mateial 202*a* is installed as well.

Figure 9:
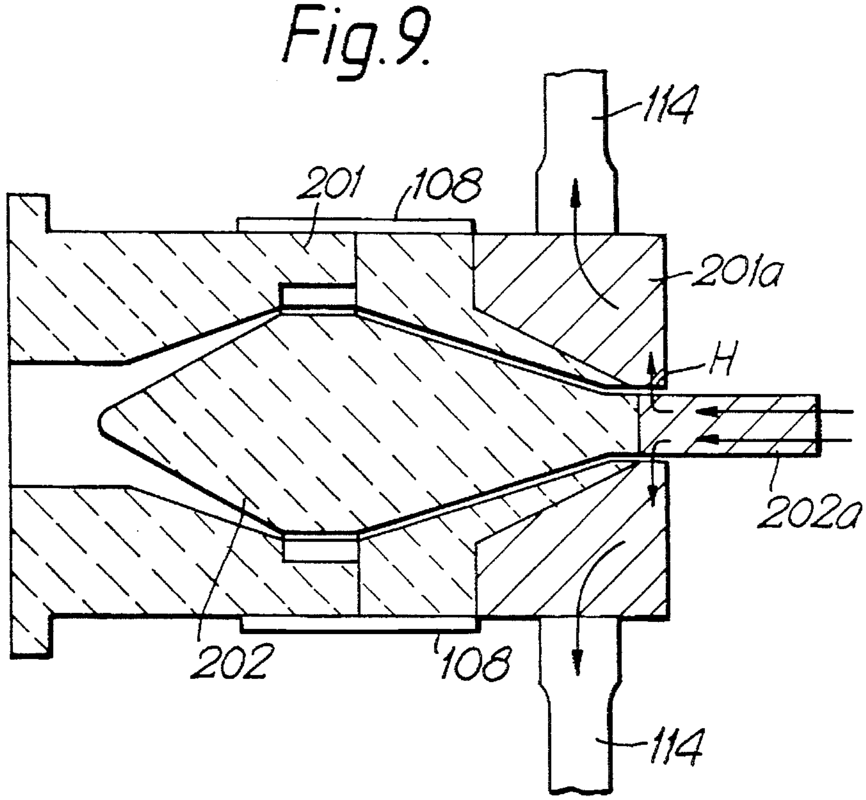
FIG. 9 is a sketch of a die structure for an extrusion moulding in a magnetic field of a cylindrical resin bound type magnet used in Example of this invention.

When a current is turned on in the electromagnetic coil 109 installed outside the die, the magnetic flux generated flows in a direction of the arrow H in FIG. 9 since it tends to pass in a magnetic material with a high magnetic permeability. Therefore a radiated magnetic field is generated in a space (hereinafter called an orientation section) between the front end 202*a* of the mandrel and magnetic material ring 201*a* installed in the outer die. Thus while a magnetic composition passes through the orientation section, it is moulded with a progress of an orientation of the magnetic powder.

In this example, the magnetic field for the moulding was 15 kOe, the die temperature at the moulding was 250° C., and the cooling was carried out by a forced air cooling at the outlet section of the die. Thus the orientated raw material compound 111 was moulded by an extrusion by a solidification with cooling at the outlet of the die. The size of the cylindrical moulded article is an outer diameter of 33mm and an inner diameter of 32 mm.

The moulded article was cut into a suitable length, was demagnetized, and further it was divided into two equal sections in parallel with the central axis of the moulded article. The moulded article was then made in a thin plate state by heating at 180° C. with a press unit shown in FIG. 12.

The press unit is to press a moulded article 603 by moving the press plate 601 located in upper position downward as shown by an arrow. The thickness of the moulded article is adjusted by a spacer 602. The press unit was placed in a firing furnace as same as Example 17, was heated and the moulded article was set on the press plate.

A press was carried out to make a thin plate state when the viscosity of the moulded article dropped, the edges were cut, and finally a thin plate state magnet with the desired size was obtained. The size of the moulded article had a width of 50 mm and a thickness of 1 mm. The magnetic property of the moulded article obtained in Test 4 is shown in Table 20.

As a comparative example, Test 55 was carried out by an extrusion moulding by using a die shown in FIG. 6, and the magnetic property of the moulded article in a thin plate state is also shown.

As for the raw material compound, the same one as to Test 54 was used.

In the die, when a current is turned on in the electromagnetic coil 403, a magnetic field vertical to the passage of the compound in the die is formed between upper and lower pole pieces 404. Therefore a thin plate state magnet of which the magnetic powder is orientated in the thickness direction can be moulded. The magnetic field at the moulding was 11 kOe, and the size of the moulded article was the same as example of Test 54.

A mouldability is also shown in Table 20 with the magnetic property.

TABLE 20

| | (BH) max (MGOe) | Moudability |
|---|---|---|
| Test 54 (Example) | 7.5 | Good |
| Test 55 (Comparative example) | 2.4 | Ordinary |

As it is clear from Table 20, though the same moulding raw material was used, the comparative example Test 55 showed lower magnetic property. It was considered that it was due to an impossibility to enlarge the magnetic field for the moulding because of the structural problem of the die in case of the comparative example Test 55 resulting an insufficient orientation of the magnetic powder.

Furthermore it was very difficult to achieve a stable moulding in case of Test 55 of the comparative example, and it had a high rejection rate. Moreover the fabrication cost of the die used in the comparative example Test 55 was approximately three times more expensive than the die used in Test 54 of example, and it was more costly than the total cost of the die and the press unit in example of Test 54.

Consequently, by using the moulding method of this invention, a high performance thin plate state resin bound type rare earth magnet can be produced with a good productivity.

EXAMPLE 19

Raw materials to make a composition of Nd 13 Fe 82.7 B 4.3 were molten as similar to Example 17, were cast and a quenched ribbon was prepared in an argon atmosphere by using a quenching and ribbon rolling machine from the ingot obtained.

The quenched ribbon was coarsely crushed, it was transferred to a mould, and a high pressure press moulding was carried out in an argon atmosphere at 700°–800° C. with a 20 $Kg/mm^2$ pressure for a short time.

The consolidated article obtained had a density almost 100%. The consolidated article obtained was moulded again by the high temperature press moulding in a vertical direction to the first pressing direction in an argon atmosphere at 700°–800° C. with a 10 $Kg/mm^2$ pressure (Namely a die upset was carried out).

The bulk state magnet was crushed and a magnetic powder of an average particle size of 20 μm was obtained.

The magnetic powder was mixed with a resin powder comprising a mixture of bisphenol A type epoxy, novolak type epoxy and vinylbutyral-vinylalcohol copolymer, calcium stearate powder and silica powder as additives to make a ratio of 90.3 wt %, 9.1 wt % and 0.4 wt % and 0.2 wt % respectively.

Then the mixture was kneaded by a two roller type mill at 90° C. The kneaded mixture was granulated to particles of the outer diameter of 1–10 mm to make a raw material compound, and a cylindrical magnet was moulded by using an extrusion moulding machine shown in FIG. 1 and a die shown in FIG. 2 as similar to Example 18.

The moulded article was cut into a suitable length, was demagnetized, and further one point on the circumference parallel to the central axis of the moulded article was cut. The moulded article was fired at 200° C. for 45 minutes while it was being made in a thin plate state by a press unit similar to Example 18 to crosslink the organic resin in the moulded article.

The magnetic properties of the thin plate state moulded articles when Test 56–61 were carried out by changing the size of the moulded articles of the extrusion moulding are shown in Table 21.

TABLE 21

| Test No | Outer Diameter (mm) | Inner Diameter (mm) | d/D | (BH) max (MGOe) |
|---|---|---|---|---|
| 56 | 22 | 20 | 0.91 | 10.2 |

TABLE 21-continued

| Test No | Outer Diameter (mm) | Inner Diameter (mm) | d/D | (BH) max (MGOe) |
|---|---|---|---|---|
| 57 | 22 | 19 | 0.86 | 10.0 |
| 58 | 22 | 18 | 0.82 | 8.2 |
| 59 | 33 | 32 | 0.97 | 10.4 |
| 60 | 33 | 28 | 0.85 | 10.1 |
| 61 | 33 | 25 | 0.76 | 7.5 |

As is clear from Table 21, if the ratio d/D between the outer diameter (D) and the inner diameter (d) is below 0.85, the magnetic property is deteriorated. It is considered that this is due to a formation of disorder on the orientation of the magnetic powder while it is being made in a thin plate state because the thickness of the cylindrical moulded article is thick in comparision with the outer diameter. Consequently in the moulding process of this invention when the d/D is limited as $$0.85 \leqq d/D < 1,$$

a magnet with a high magnet performance can be produced.

We claim:

1. A resin bonded magnet comprising a rare earth magnetic powder and an organic resin wherein it is moulded as a single body in a cylindrical form satisfying a relation of $$2DL/d^2 \geqq 1.56$$

among the outer diameter (D), the inner diameter (d) and the length (L) of the magnet, and it also has a radial orientation said rare earth magnetic powder having a coercivity of between kOe and 12 kOe and wherein an average particle size of the aforementioned magnetic powder satisfies $$1\ \mu \leqq r \leqq 0.1\ t\ (t \leqq 1\ mm)$$

with the thickness t of the moulded article.

2. A resin bonded magnet according to claim 1 comprising a rare earth magnetic powder and an organic resin wherein an average particle size r of the aforementioned magnetic powder satisfies $$1\ \mu m \leqq r \leqq 0.1\ t\ (t \leqq 1\ mm)$$

with the thickness t of the moulded article of an anisotropic resin bonded magnet comprising said rare earth magnetic powder and resin.

3. A resin bonded magnet according to claim 1 comprising a rare earth magnetic powder, an organic resin and an additive wherein an average particle size r of the aforementioned rare earth magnetic powder satisfies $$1\ \mu m \leqq r \leqq 0.1\ t\ (t \leqq 1\ mm)$$

wherein t is the thickness of the moulded body.

4. A resin bonded magnet described in any one of claim 2 or claim 3 wherein the aforementioned rare earth magnetic powder is selected from a magnet having a composition comprising rare earth metal and transition metals mainly constituting cobalt and iron or a magnet having a composition comprising rare earth metal, transition metal mainly constituting iron and boron.

5. A resin bonded magnet described in any one of claim 2 or claim 3 wherein the aforementioned organic resin is a thermoplastic resin or a thermosetting resin.

6. A resin bonded magnet described in claim 5 wherein the aforementioned thermoplastic resin is selected from the group consisting of polyamide, polypropylene, polycarbonate, polyphenylenesulphide, chlorinated polyethylene, an elastomer of vinylethyleneacetate copolymer and a synthetic rubber.

7. A resin bonded magnet described in claim 5 wherein the aforementioned thermosetting resin is an ethylene family unsaturated polyester resin or an epoxy resin.

8. The resin bonded magnet of claim 1 having the thickness T, wherein:

$$0.01\ mm \leqq T \leqq 1\ mm.$$

9. A resin bonded magnet comprising a rare earth magnetic powder, an organic resin and an additive wherein it is moulded as a single body in a cylindrical form satisfying a relation of $$2DL/d^2 \geqq 1.56$$

among the outer diameter (D), the inner diameter (d) and the length (L) of the magnet, and it also has a radiated anisotropy in the diameter direction, said rare earth magnetic powder having a coercivity of between 7 kOe and 12 kOe and wherein an average particle size r of the aforementioned magnetic powder satisfies $$1\ \mu m \leqq r \leqq 0.1\ t\ (t \leqq 1\ mm)$$

with the thickness t of the moulded article.

10. A resin bonded magnet described in claim 9 or claim 3 wherein the aforementioned additive is selected from the group consisting of zinc stearate, calcium sterate, wax and peroxides.

* * * * *